United States Patent
Kuan et al.

(10) Patent No.: US 9,647,909 B2
(45) Date of Patent: May 9, 2017

(54) MONITOR A DATA CENTER INFRASTRUCTURE

(71) Applicants: Chia-Chee Kuan, Los Altos, CA (US); Miles Wu, Los Altos, CA (US); Dong Nguyen, Los Altos, CA (US)

(72) Inventors: Chia-Chee Kuan, Los Altos, CA (US); Miles Wu, Los Altos, CA (US); Dong Nguyen, Los Altos, CA (US)

(73) Assignee: UILA NETWORKS, INC., Los Altos, CA (US)

( * ) Notice: Subject to any disclaimer, the term of this patent is extended or adjusted under 35 U.S.C. 154(b) by 229 days.

(21) Appl. No.: 14/494,427

(22) Filed: Sep. 23, 2014

(65) Prior Publication Data

US 2016/0087859 A1    Mar. 24, 2016

(51) Int. Cl.
*H04L 12/26* (2006.01)
*G06F 11/34* (2006.01)
*H04L 12/24* (2006.01)
*G06F 11/30* (2006.01)

(52) U.S. Cl.
CPC ........ *H04L 43/045* (2013.01); *G06F 11/3409* (2013.01); *H04L 41/065* (2013.01); *H04L 41/12* (2013.01); *H04L 43/0817* (2013.01); *H04L 43/026* (2013.01); *H04L 43/028* (2013.01); *H04L 43/0823* (2013.01); *H04L 43/12* (2013.01); *H04L 43/18* (2013.01)

(58) Field of Classification Search
CPC ............ G06F 11/3006; G06F 11/3409; H04L 41/065; H04L 41/12; H04L 43/026; H04L 43/028; H04L 43/045; H04L 43/0817; H04L 43/0823; H04L 43/12; H04L 43/18

USPC ................................... 715/736; 709/223–224
See application file for complete search history.

(56) References Cited

U.S. PATENT DOCUMENTS

| | | | | |
|---|---|---|---|---|
| 7,031,895 B1* | 4/2006 | Takahashi | ........... | G06F 17/5009 703/13 |
| 7,519,700 B1* | 4/2009 | Sapsford | ........... | G06F 17/30961 709/223 |
| 2009/0161544 A1* | 6/2009 | Kelly | ............... | H04L 43/026 370/232 |
| 2011/0264797 A1* | 10/2011 | Matityahu | ............... | H04L 43/04 709/224 |
| 2011/0307889 A1* | 12/2011 | Moriki | ............... | G06F 9/45558 718/1 |
| 2012/0096185 A1* | 4/2012 | Naparstek | ............. | H04L 41/145 709/246 |
| 2013/0166749 A1* | 6/2013 | Kruglick | ............... | G06F 9/5077 709/226 |
| 2013/0290520 A1* | 10/2013 | Noo | ...................... | H04L 41/147 709/224 |
| 2014/0229605 A1* | 8/2014 | Besser | ................... | H04L 43/12 709/224 |

(Continued)

*Primary Examiner* — Alina N Boutah
(74) *Attorney, Agent, or Firm* — Blakely, Sokoloff, Taylor & Zafman LLP

(57) ABSTRACT

A method and apparatus for monitoring a data center infrastructure are described. In one embodiment, the method comprises collecting traffic data from the network, collecting storage I/O performance information, collecting central processing unit (CPU) and memory usage information, determining a virtual infrastructure of the network, compute and storage comprising virtual entities; and grouping the traffic data based at least on the virtual entities.

31 Claims, 28 Drawing Sheets

(56) References Cited

U.S. PATENT DOCUMENTS

| | | | |
|---|---|---|---|
| 2014/0269777 A1* | 9/2014 | Rothstein | H04L 43/0823 370/503 |
| 2014/0325058 A1* | 10/2014 | Fletcher | H04L 43/045 709/224 |
| 2015/0071072 A1* | 3/2015 | Ratzin | H04L 47/11 370/235 |
| 2015/0113132 A1* | 4/2015 | Srinivas | H04L 41/0816 709/224 |
| 2015/0319030 A1* | 11/2015 | Nachum | H04L 41/02 370/250 |
| 2015/0350094 A1* | 12/2015 | Izhak-Ratzin | H04L 47/2441 370/235 |
| 2015/0351042 A1* | 12/2015 | Harper | H04W 52/18 370/329 |
| 2016/0065448 A1* | 3/2016 | Loveless | G09C 1/00 370/218 |
| 2016/0094461 A1* | 3/2016 | Shetty | H04L 47/20 370/235 |

\* cited by examiner

| | Storage | CPU | Memory |
|---|---|---|---|
| | Ring Structure Definition | | |
| Ring 1 (inner) | Data store (logical) | Cluster | Cluster |
| Ring 2 (middle) | Host | Host | Host |
| Ring 3 (outer) | vDisk (on VM) | VM | VM |
| | Ring Color Definition (Performance metrics against Baseline) | | |
| Ring 1 (inner) | DataStore.totalLatencyAverage | Summation of all Host.cpu.ready.summation in the cluster | Cluster.mem.swapinRate.Average |
| Ring 2 (middle) | Host.totalLatencyAverage | Host.cpu.ready.summation | Host.mem.swapinRate.Average |
| Ring 3 (outer) | VM.virtualdisk.totalReadlatency + VM.virtualdisk.totalWritelatency | VM.cpu.ready.summation | VM.mem.swapinRate.Average |
| | Ring Size Definition | | |
| Ring 1 (inner) | Cluster.disk.numberWriteAveraged.average + Cluster.disk.numberWriteAveraged.average | Summation of all Host.cpu.usageMhz.average | Cluster.mem.consued.average |
| Ring 2 (middle) | Host.disk.numberWriteAveraged.average + Host.disk.numberWriteAveraged.average | Host.cpu.usageMhz.average | Host.mem.consued.average |
| Ring 3 (outer) | vDisk.disk.numberWriteAveraged.average + vDisk.disk.numberWriteAveraged.average | VM.cpu.usageMhz.average | VM.mem.active.average |

FIG. 6

MONITOR A DATA CENTER INFRASTRUCTURE

FIELD

Embodiments as described herein relate generally to computer networks, and more specifically, to monitoring the computer networks.

BACKGROUND

A data center typically refers to a large group of networked computer servers typically used by organizations for the remote storage, processing, or distribution of large amounts of data. A data center typically uses virtualized servers running on the physical servers and serving multiple client organizations (tenants). With a multitenant architecture, a software application is designed to virtually partition its data and configuration, and each tenant works with a customized virtual application. Typically, server to server traffic is known as east-west traffic, while client-server traffic is known as North-South traffic.

Generally, virtualization refers to technologies designed to provide a layer of abstraction between computer hardware systems and the software running on them. A hypervisor or virtual machine monitor (VMM) typically refers to a piece of computer software, firmware or hardware that creates and runs virtual machines (VMs). VMs are created within a virtualization layer, such as a hypervisor or a virtualization platform that runs on top of a client or server operating system. The virtualization layer can be used to create many individual, isolated VM environments. Typically, VMs are the operating systems that run on hypervisors. With hypervisors, multiple operating systems can run concurrently on a host machine because the hypervisor abstracts the hardware resources and manages their allocations.

Generally, cloud computing refers to a model of network computing where a program or application runs on a connected server or servers in the data center rather than on a local computing device such as a personal computer, tablet or smartphone. The computing process may run on one or many connected computers at the same time, utilizing the concept of virtualization. With virtualization, one or more physical servers of the data center can be configured and partitioned into multiple independent virtual servers, all functioning independently and appearing to the user to be a single physical device. The virtual machine typically emulates a physical computing environment, but requests for CPU, memory, hard disk, network and other hardware resources are managed by a virtualization layer which translates these requests to the underlying physical hardware.

Existing network monitoring tools generally require specialized hardware, a physical probe, and wires located on the physical layer of the network. For example, the existing network monitoring tools use a data monitoring switch (e.g., Switched Port Analyzer (SPAN)) to send a copy of network packets seen on one switch port to a network monitoring connection on another switch port. A data monitoring switch is a networking hardware appliance that provides a pool of monitoring tools with access to traffic from a large number of network links. The existing network monitoring tools typically use a rack-mounted hardware network packet broker (NPB) device that gathers and aggregates the network traffic from the switch SPAN ports and then distributes that traffic to network security and performance tools.

The existing network monitoring tools are mostly manually controlled. Moreover, the existing network monitoring tools are typically fixed, static and un-scalable hardware appliances. They are expensive and slow to deploy. A virtual machine environment creates blind spots and reduces visibilities of the network. East-west traffic between virtual machines in the data center strains the ability of the data center to manage network and optimize work flow. However, the existing network monitoring tools lack virtual network visibility. The existing network monitoring tools may not obtain individual tenant data in a multi-tenant data center. The existing network monitoring tools lack scalability and agility to cope with dynamic network changes in a virtual machine environment.

SUMMARY

A method and apparatus for monitoring a data center infrastructure are described. In one embodiment, the method comprises collecting traffic data from the network, collecting storage I/O performance information, collecting central processing unit (CPU) and memory usage information, determining a virtual infrastructure of the network, compute and storage comprising virtual entities; and grouping the traffic data based at least on the virtual entities.

BRIEF DESCRIPTION OF DRAWINGS

The embodiments as described herein are illustrated by way of example and not limitation in the figures of the accompanying drawings in which like references indicate similar elements.

FIGS. 4A-4D-3 show diagrams illustrating a screen of display device displaying infrastructure performance monitoring data according to one embodiment.

FIG. 6 illustrates a chart that specifies one embodiment of a ring structure definition for the storage, CPU, and memory performance windows and associated statistics.

DETAILED DESCRIPTION

Embodiments as described herein provide an open virtual infrastructure monitoring platform that delivers flow analysis and application performance monitoring of data flow in network arrangements and components, such as, for example, cloud computing networks and a software-defined networking (SDN) data center. In one embodiment, the monitoring occurs from the virtual layer to provide network analysis for virtualized networks, offering visibility into the virtualized network for an operator to enable analysis of the entire data center and/or individual tenants.

In one embodiment, the monitoring is performed on virtual applications that comprise a group of virtual machines (VMs) working together to provide a service. By grouping the performance statistics of the group of VMs of a virtual application, then the virtual application can be analyzed. More specifically, the monitoring is performed using a series of taps that are set up to duplicate packets and forward those duplicate packets, via network packet broker, to monitoring tools. The monitoring tools are able to aggregate the packets for individual packet flows and analyze the packet flows. Thus, using the network packet broker and the monitoring tools, the duplicated packet data for flows being monitored is aggregated and summarized according to the virtual infrastructure of which they are part.

Figure 1:
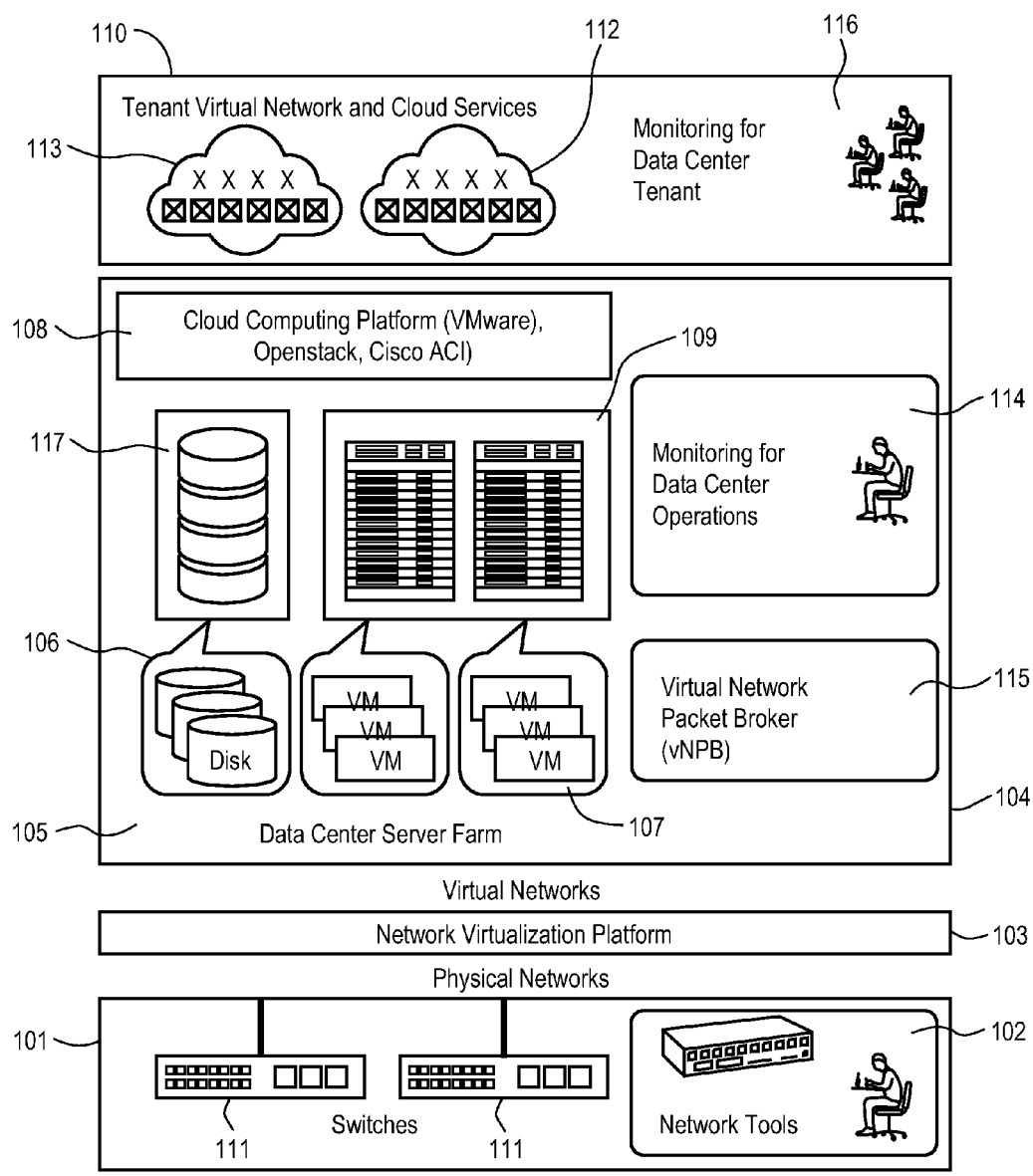
FIG. 1 shows a diagram illustrating an exemplary infrastructure performance monitoring system according to one embodiment.

FIG. 1 shows a diagram illustrating an exemplary network monitoring system 100 according to one embodiment. Referring to FIG. 1, network monitoring system 100 is a distributed virtual monitoring system that provides virtual network visibility. As shown in FIG. 1, network monitoring system 100 comprises physical networks 101. Physical networks 101 comprise physical (e.g., hardware) entities, e.g., switches 111. Physical network monitoring tools 102 can be optionally coupled to the switches 111.

As shown in FIG. 1, network virtualization platform 103 overlays physical networks 101. Virtual networks 104 operate over network virtualization platform 103. Virtual networks 104 comprise a data center server farm 105. The data center server farm 105 comprises a plurality of server racks 109. A virtual infrastructure of the data center server farm 105 comprises virtual entities. As shown in FIG. 1, virtual machines 107 run on each of the server racks. Thus, in essence, a virtualized network layer is overlaid on top of physical networks 101.

Data center server farm 105 further comprises a storage 117, which may comprises a plurality of virtual disks 106. Data center virtual networks 104 comprise a cloud computing platform 108 (e.g., VMware, Openstack, Cisco ACI, or other cloud computing platform). Data center virtual networks 104 comprise a virtual network packet broker (vNPB) 115 coupled to data center server farm 105. In an embodiment, vNPB 115 is a software-based distributed virtual NPB. In an embodiment, vNPB 115 uses physical network monitoring tools 102 for monitoring the virtual networks and SDN.

In one embodiment, data center virtual networks 104 comprise a monitoring tool for data center operators 114 coupled to data center server farm 105. In one embodiment, the monitoring tool for data center operators 114 provides virtual and physical network dependency analytics. In one embodiment, a monitoring tool for data center operators 114 receives packet data from a virtual network traffic tap that taps the traffic data from data center server farm 105 and sends it to virtual network packet broker (vNPB) 115.

Tenant virtual network and cloud services 110 operate using a cloud computing platform 108. In one embodiment, tenant virtual network and cloud services 110 comprise a plurality of tenants 113. Tenant virtual network and cloud services 110 comprise a monitoring tool for data center tenant 116 to monitor the individual tenant traffic data to provide tenant network visibility and cloud service assurance. In one embodiment, a monitoring tool for data center tenant 115 is coupled to data center server farm 105 and receives packet data from a virtual network traffic tap that taps the tenant traffic data from the data center server farm 105.

Figure 12:
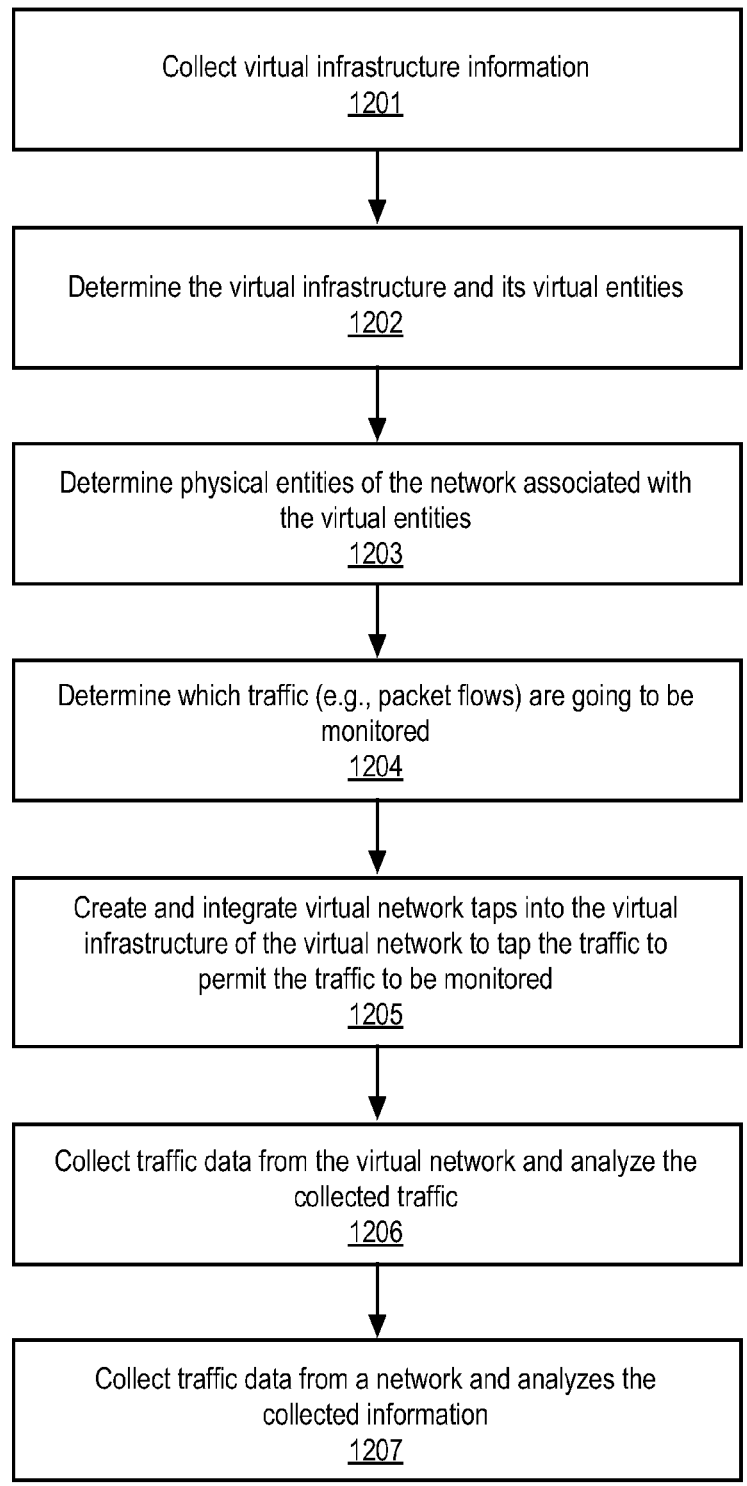
FIG. 12 is a flow diagram of one embodiment of a process for monitoring a network.

FIG. 12 is a flow diagram of one embodiment of a process for monitoring a network. The process is performed by processing logic that may comprise hardware (e.g., circuitry, dedicated logic, etc.), software (such as is run on a general purpose computer system or a dedicated machine), firmware, or a combination of all three.

Referring to FIG. 12, the process begins by processing logic collecting virtual infrastructure information processing block 1201). Such virtual infrastructure information includes information indicating relationships between the virtual entities, including the logical port groups, virtual machines (VMs), and the virtual network interfaces. In one embodiment, these are obtained and stored in a table representing the virtual infrastructure. This in essence is used to create a map that maps traffic that traverses the virtual infrastructure.

In one embodiment, the virtual infrastructure information is collected each time a new virtual application is started. A virtual application comprises one or more VMs that work together and are associated with an application server to provide a service. By grouping the performance statistics of the group of VMs of a virtual application, the performance of the virtual application can be analyzed. When the virtual application is started, processing logic starts the VMs associated with the virtual application and notifies a virtual NTT (vNTT) of the VMs that have been spawned and their location in the virtual infrastructure that implement its service so that a complete picture of the virtual infrastructure is obtained. In one embodiment, an IT operator manually starts the virtual application. Alternatively, the virtual application is pre-scheduled to run at a predetermined time. The vNTT is an agent inside the virtual infrastructure. The vNTT is notified by the virtualization platform, such as, for example, VMware, that a new VM or workflow has started.

Once the virtual infrastructure information has been obtained, processing logic determines the virtual infrastructure and its virtual entities (processing block 1202). The virtual entities are, for example, one or more virtual machines, a virtual switch, a port group/tenant, a virtual network; a virtual network interface card, or any combination thereof.

Once the virtual infrastructure has been obtained, processing logic determines physical entities of the network associated with the virtual entities (processing block 1203). The physical entities can be, for example, physical devices, such as one or more switches, host computing devices (e.g., servers), clusters of the computing devices.

Thereafter, processing logic determines which traffic (e.g., packet flows) are going to be monitored (processing logic 1204). In one embodiment, the vNTT monitors and tracks all traffic it sees, and the vNTT is only deployed to the host that has the target VMs for monitoring.

After determining which traffic is to be monitored, processing logic creates and integrates virtual network taps into the virtual infrastructure of the virtual network to tap the traffic to permit the traffic to be monitored (processing block 1205). In one embodiment, these taps are set up to duplicate packets and forward duplicated packets, via a virtual network packet broker (vNPB), to monitoring tools.

More specifically, when using the virtual network taps to obtain duplicated packets for monitoring, the traffic is pulled from this source, such that the source creates and sends the duplicate packets to the vNPB. That is, an agent on the server sees all the packets and allows the originally sent packets to be sent to their destination, while also sending a duplicated copy of the packet for analysis. For example, if the packet flow is from a file transfer application server and it is being monitored, then all packet flows from that server are duplicated at its source and are sent to a file transfer monitoring tool. In one embodiment, the virtual taps implement a connection to the virtual switch via a virtual port, and the virtual port is configured on the virtual switch as a virtual monitoring port, which is a promiscuous receiving port for all packets that flow through the virtual switch.

Once the virtual network taps are in place, processing logic collects traffic data from the virtual network and analyzes the collected traffic (processing block 1206). A virtual network packet broker (NPB) aggregates the packets duplicated for monitoring and forwards packets to the monitoring tools, which correlate the packets with each other to associate the packets with the correct flows to ensure that packets of the same flow are analyzed together. In one embodiment, the packet flow in the virtual infrastructure is mapped at the virtual layer and groups of traffic are directed to particular monitoring tools for analysis. In one embodiment, the traffic data collected may include traffic between virtual network interface cards (vNICs). In one embodiment, the traffic data is analyzed packet-by-packet.

In one embodiment, the collected traffic data is grouped together based on the mapping information that depicts the virtual infrastructure and analyzed using the mapping information. In an embodiment, the traffic data can be grouped by the clusters, and the performance of the traffic flow for each cluster can be analyzed, and the clusters can then be ranked based on the performance to determine for example, which cluster is performing best (or worst) than other clusters. In an embodiment, the cluster traffic data are grouped by VMs, and the performance of the traffic flow for each VM is analyzed, and the VMs are then ranked based on the performance to determine which VM performs best (or worst) than other VMs. In at least some embodiments, the traffic data are grouped by a port group. In at least some embodiment, the traffic data grouped by a port group are then analyzed to determine the best port group (virtual network).

The traffic is filtered and dispatched to centralized security and net tools based on the mapping information, as described in further detail below. The network monitoring system as described herein provides an advantage of capturing and revealing complete end-to-end virtual network traffic. In at least some embodiments, the network monitoring system integrates the open virtual network monitoring platform with Virtual Machine (VM) management that provides an advantage of streamlining of workflow processing and real time troubleshooting. In at least some embodiments, the network monitoring system uses cloud/software technology to offer agility and scalability while reducing cost. Thus, traffic monitoring is performed from the virtual layer of the network using the virtual network traffic tap.

Figure 8:
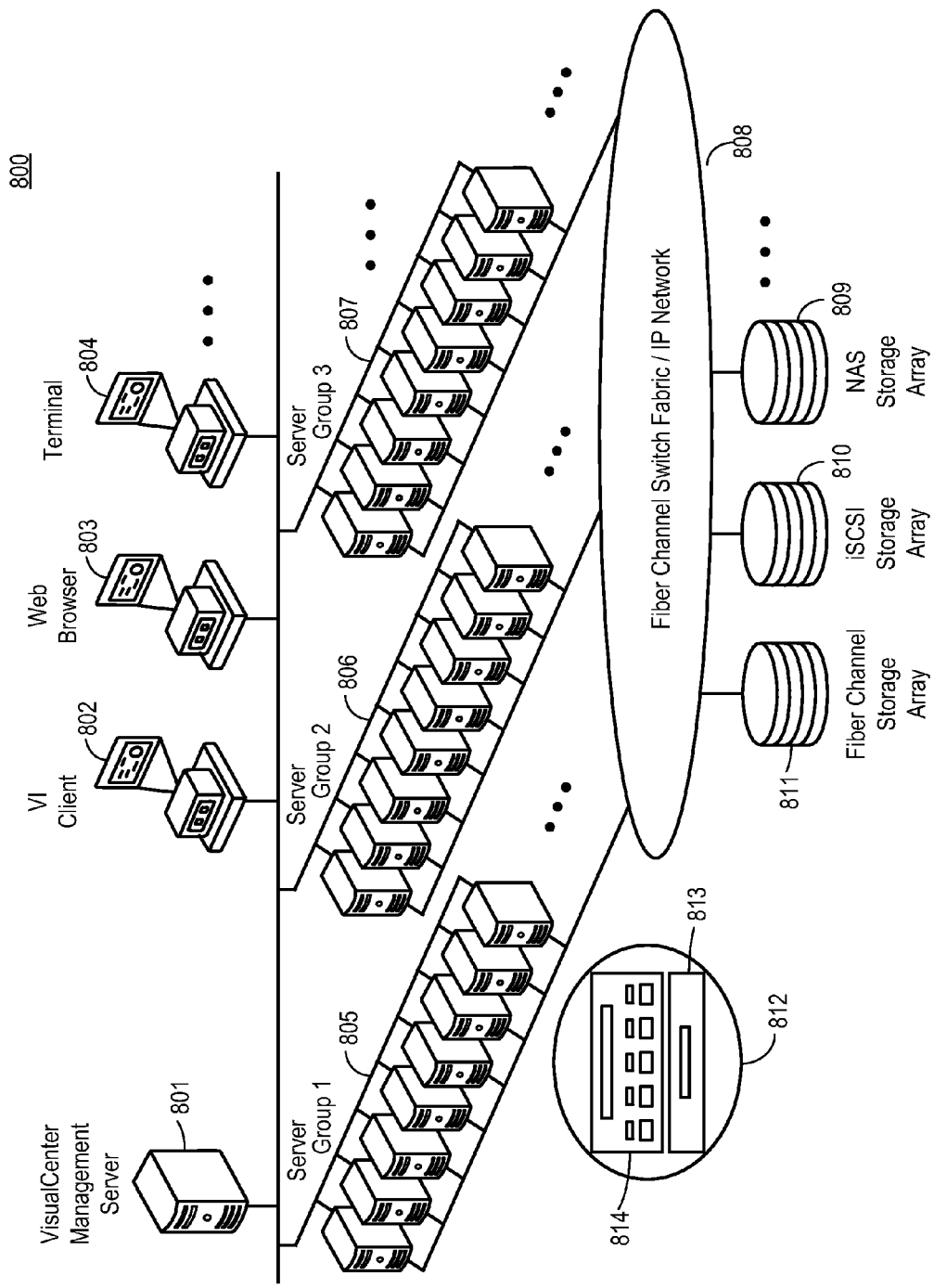
FIG. 8 shows a diagram illustrating clusters of physical hosts according to one embodiment.

FIG. 8 shows a diagram 800 illustrating clusters of physical hosts according to one embodiment. Referring to FIG. 8, a virtual infrastructure of data center physical building blocks comprises a virtual center management server 801, a virtual client 802, a web browser 803, and a terminal 804. The data center comprises groups of servers 805, 806, 807 that each include hardware. Each of the server groups represents a cluster of physical hosts. Each cluster of physical hosts runs a virtual component of the network. For example, in one embodiment, cluster 805 (server group 1) operates a virtual center management server, cluster 806 (server group 2) operates virtual client 802, and cluster 807 (server group 3) operates a web browser 803 and terminal 804. Each server of the cluster comprises one or more virtual machines, such as VMs 814 operating on an ESX server. Generally, the ESX server is a hypervisor that creates logical pools of system resources so that many virtual machines can share the same physical resources.

In one embodiment, clusters 805, 806, and 807 are connected to a fiber channel switch fabric/IP network 808. In one embodiment, fiber channel switch fabric/IP network 808 is connected to a fiber channel storage array 811, an Internet Small Computer System Interface (iSCSI) storage array 810, and a network attached storage array 809. Typically, clusters can have their own unique physical differences, for example, some clusters may have larger disk space locally than other clusters.

Figure 9:
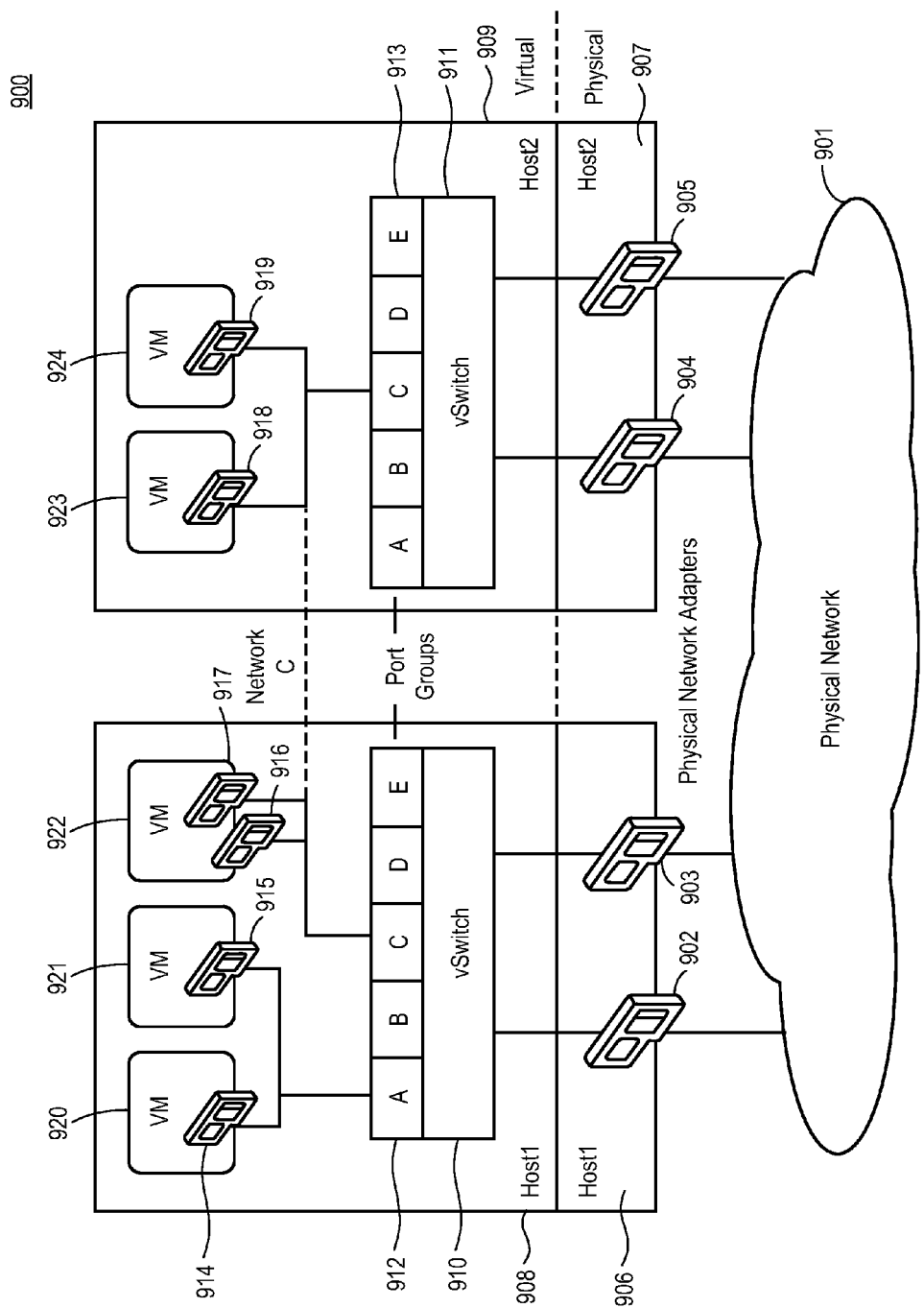
FIG. 9 shows a diagram illustrating a physical network interface card (NIC) and a virtual NIC/port group system according to one embodiment.

FIG. 9 shows a diagram illustrating a physical network interface card (NIC) and a virtual NIC/port group system 900 according to one embodiment. System 900 comprises a physical network 901 connected to a physical host 906 via physical network adapters 902 and 903, and connected to a physical host 907 via physical network adapters 904 and 905. Physical host 906 includes a virtual host 908, and physical host 907 runs a virtual host 909. Virtual host 908 comprises a virtual switch 910. Virtual switch 910 comprises a group 912 of one or more ports, Exemplary ports of port group 912 are labelled A, B, C, D, and E. Virtual host2 909 comprises a virtual switch 911. Virtual switch 911 comprises a group 913 of ports A, B, C, D, and E. Virtual machines are "plugged into" a virtual port group. In one embodiment, these connections are implemented in the virtual infrastructure using a vSwitch internal connection table. For example, a virtual port A of group 912 is connected to VM 920 via a virtual NIC 914 and is connected to VM 915 via a virtual NIC 915. A virtual port C of group 912 is connected to VM 922 via a virtual NICs 916 and 917. A virtual port C of group 913 is connected to VM 923 via a virtual NIC 918, and is connected to VM 919 via a virtual NIC 919.

As shown in FIG. 9, a physical host 906 through virtualization is split into a plurality of different virtual networks (port groups). As shown in FIG. 9, VMs 920 and 921 are plugged into a port group A which means they are on the same virtual network. VMs 922, 918, and 919 are plugged into a port group C on the same virtual network C.

Referring back to FIG. 12, at operation 1204, protocol entities of the network are determined. The protocol entities can be for example, communication protocols, e.g., security protocols, or any other communication protocols (e.g., HTTP, HTTPs). It should be noted that at least in some embodiments, operations 1201, 1202, 1203, 1204 can be performed in any order. At operation 1205, at least one of the virtual entities, physical entities, and protocol entities is mapped to the collected traffic data.

Figure 11:
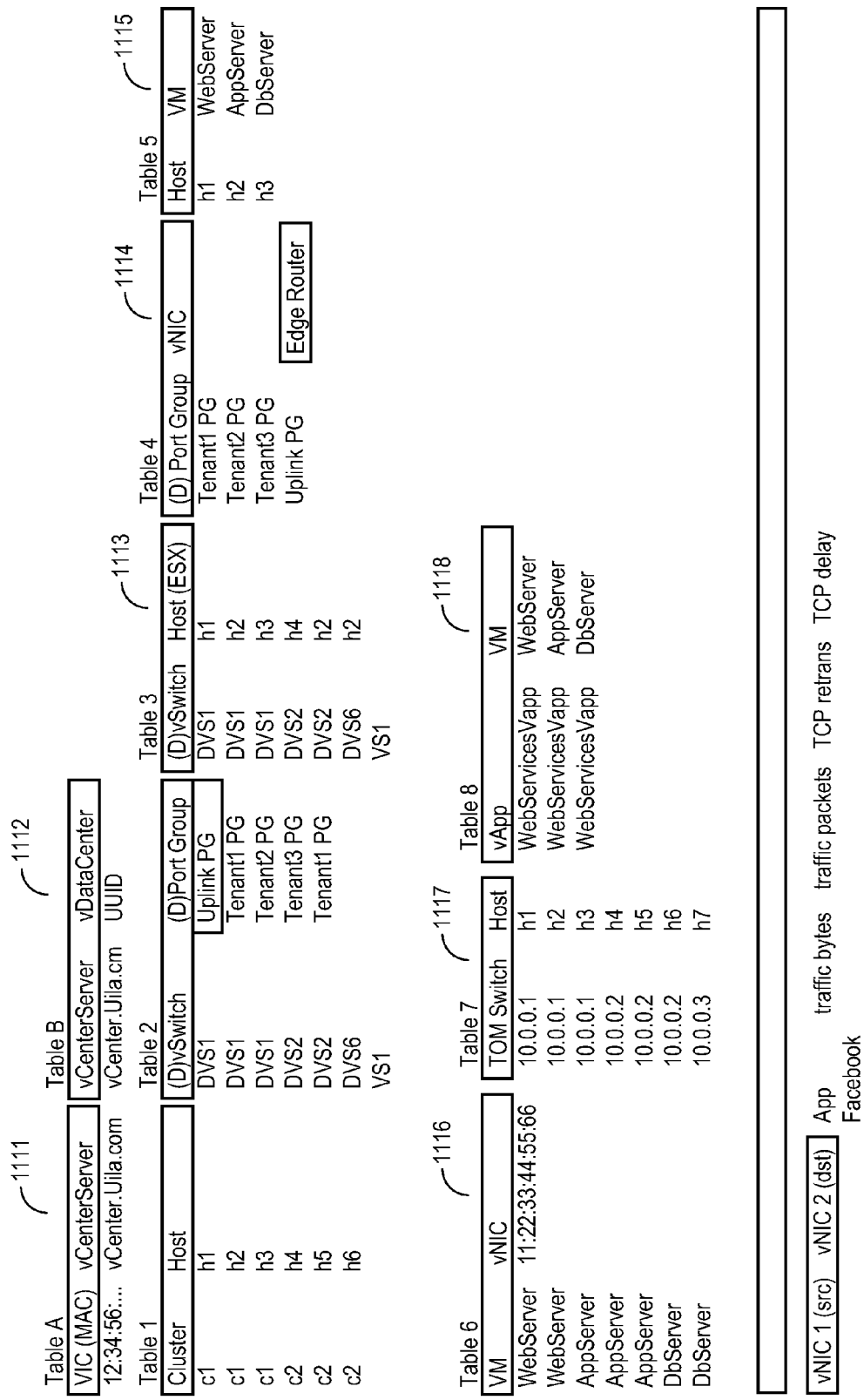
FIG. 11 is a view illustrating physical and virtual networking mapping from a virtual infrastructure of the network according to one embodiment.

FIG. 11 is a view 1100 illustrating physical and virtual networking mapping from a virtual infrastructure of the network according to one embodiment. In at least some embodiments, a data structure (e.g., a table, or other data structure) containing mapping information between one or more of the virtual entities, physical entities, and protocol entities is created and stored in a memory. In at least some embodiments, the data structure contains a physical networking mapping (e.g., a cluster to hosts, a host to physical NICs, a physical NIC to a physical switch port, a physical switch port to a top of rack (TOR) switch). In at least some embodiments, the data structure contains a virtual networking mapping (e.g., a vApp to a VM, a VM to vNICs, a vNIC to a physical NIC, a port group (virtual network) to vNICs).

As shown in FIG. 11, data structure 1111 contains cluster identifiers mapped to corresponding hosts identifiers. As shown in FIG. 11, hosts 1, 2, and 3 are part of a cluster c1, and hosts 4, 5, and 6 are part of a cluster c2. Data structure 1112 comprises virtual switch identifiers mapped to identifiers of corresponding port groups. Each virtual switch may have one or more port groups. Data structure 1113 contains virtual switches identifiers mapped to identifiers of corresponding hosts (ESXs). Data structure 1114 contains identifiers of port groups mapped to the identifiers of corresponding vNICs. Data structure 1115 contains identifiers of hosts' mapped to the identifiers of corresponding VMs. Data structure 1116 contains identifiers of VMs mapped to the identifiers of corresponding vNICs. A data structure 1117 contains identifiers a mapping between of identifiers for vApps to VM identifiers.

Referring back to FIG. 1, the visibility network analysis of the virtualized network can be provided for the operator of the whole data center using for example, monitoring unit 114, for each the tenants using for example monitoring unit 116, or a combination thereof. In at least some embodiments, virtual Network Packet Broker (vNPB) 115 performs packet filtering and dispatch using the server and network virtualization infrastructure of the data center virtual networks 104. The visibility network analysis of the virtualized network is very different from the conventional techniques, where an operator can only look at the physical network by using a physical layer solution (e.g., physical network tools 102). The network monitoring system 100 provides information technology (IT) workflow business impact analysis using a virtual and physical network analysis from the virtualized infrastructure.

Figure 2:
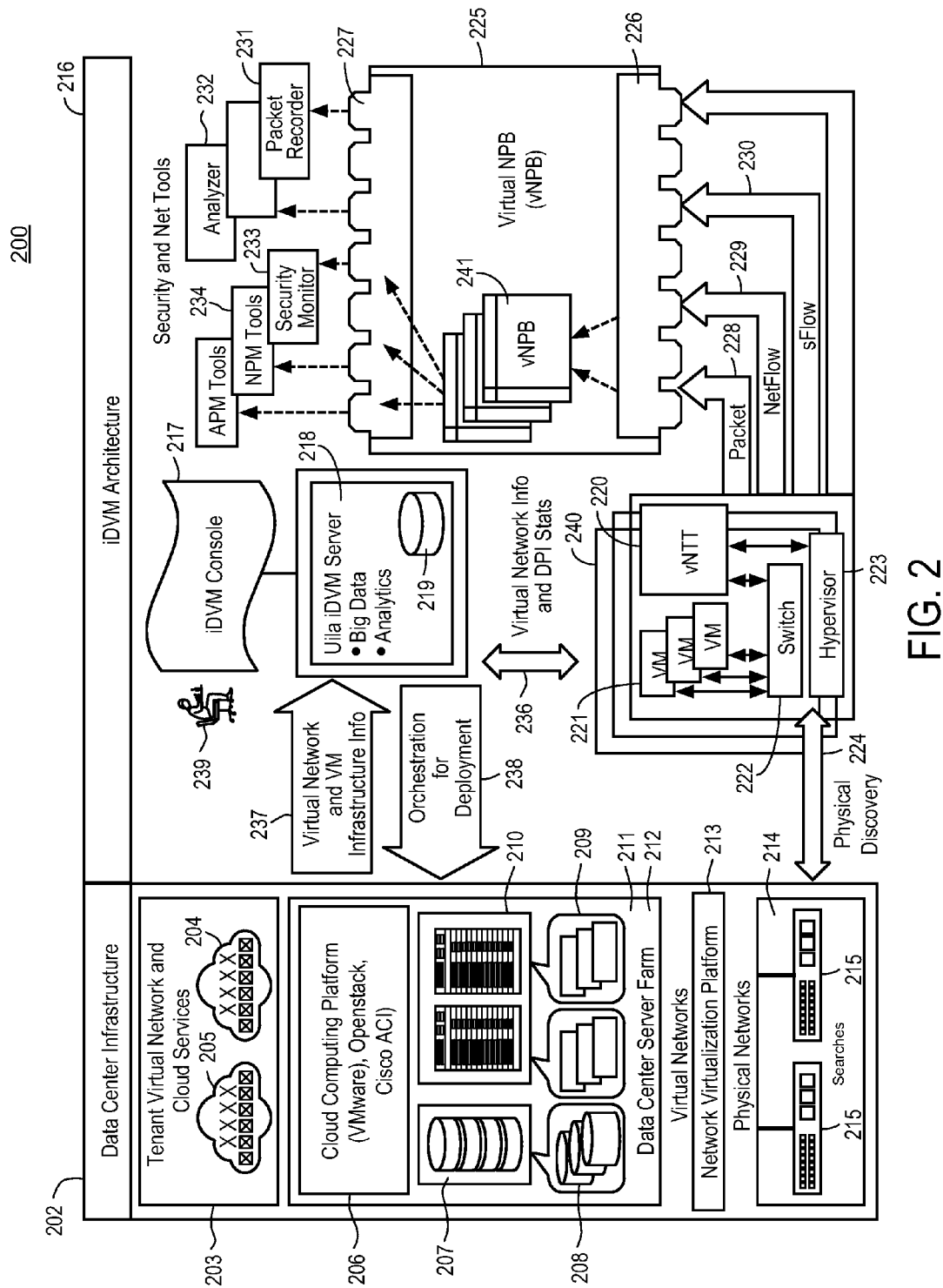
FIG. 2 shows a diagram illustrating an exemplary distributed infrastructure performance monitor (iDVM) architecture according to one embodiment.

FIG. 2 shows a diagram illustrating an exemplary distributed virtual monitor (iDVM) architecture 200 according to one embodiment. As shown in FIG. 2, a data center infrastructure 202 comprises physical networks 214 comprising physical entities, e.g., switches 215. Network virtualization platform 213 overlays physical networks 214 and interfaces the virtual networks to physical networks 214. In one embodiment, virtual networks comprise a data center server farm 212. Data center server farm 212 comprises a plurality of server racks 210. Each of the server racks comprises virtual entities, e.g., virtual machines 209. Data center server farm 212 further comprises storage 207 including a plurality of virtual disks 208.

Data center infrastructure 202 also comprises a cloud computing platform 206. The cloud computing platform 206 can be, for example, VMware, Openstack, Cisco ACI, or other cloud computing platform. In one embodiment, data center infrastructure 202 comprises a plurality of tenant virtual network and cloud services, e.g., services 205 and 206.

A distributed virtual monitoring (iDVM) architecture 216 comprises a distributed virtual monitoring (iDVM) server system 218 to collect network traffic data and perform network analytics. iDVM server system 218 has a database 219 to store the network data and analytics. iDVM server system 218 is connected to a iDVM console 217 to enable a user 239 to interact with system 218. iDVM server system 218 receives virtual network and VM infrastructure information 237 from data center infrastructure 202. In response to the information 237, iDVM server system 218 sends data 238 to orchestrate deployment of the distributed virtual monitoring of the data center infrastructure 202.

As shown in FIG. 2, a virtual network traffic tap system 240 comprises a plurality of virtual machines, such as a VM 221 that receives data from and send data to a hypervisor 223 via virtual switch 222. Depending on an embodiment, hypervisor 223 can run on a server operating system, a client operating system, or both. A virtual network traffic tap (vNTT) 220 is over hypervisor 223 and virtual switch 222. As shown in FIG. 2, vNTT system 240 performs physical discovery 224 and determines the locations to insert taps to tap traffic data. vNTT system 240 is coupled to iDVM server system 218 to and uses information received for server system 218 to determine where taps are to be placed to tap traffic. This information may include virtual network information, such as, for example, information indicating that new VMs have been spawned and the client to which they are associated. The information may also include DPI statistics.

In one embodiment, each tap is set up in the path between a VM and the hypervisor. For example, taps may be set up between VMs 221 and hypervisor 223 using vSwitch 222. In this manner, a packet flow being monitored that goes from one VM to another VM as part of a service performed by a virtual application may be passed through one tap when traversing from a first VM to its hypervisor, provided to a second hypervisor associated with a second VM, and then be tapped at a location between the second hypervisor and the second VM. In one embodiment, for example, when the east-west bound traffic (representing the situation when one VM is communicating with (e.g., sending packet flows to) another VM) is to be analyzed, the virtualized traffic is exchanged between the two, but physically the traffic goes from a VM through one hypervisor to another hypervisor, or through the same hypervisor, and then to the next VM.

vNTT system 240 sends the tapped traffic data comprising packets 228, netFlow 229, sFlow 230, other traffic data, virtual network information, or other information to virtual ingress ports 226 of a virtual network packet broker (vNPB) system 225. In one embodiment, all the taps are set up to duplicate packets and forward those duplicate packets, via vNPB 225, to the monitoring tools (e.g., 231-235). The network packet broker (NPB) is the place where the duplicated packets for flows being monitored are aggregated.

As shown in FIG. 2, vNPB system 225 comprises vNPB virtual machines, such as a VM 241. The vNPB system 225 groups, filters and dispatches the tapped traffic data based on the virtual network infrastructure data to corresponding virtual egress ports 227 connected to security and net tools, such as a packet recorder 231, analyzer 232, security monitor 233, network performance monitoring (NPM) tools 234 and application performance monitoring (APM) tools 235. These tools are well-known in the art. Network performance monitoring (NPM) tools 234 and application performance monitoring (APM) tools 235 are able to correlate the packets with each other to ensure that packets of the same flow are analyzed together.

Figure 3:
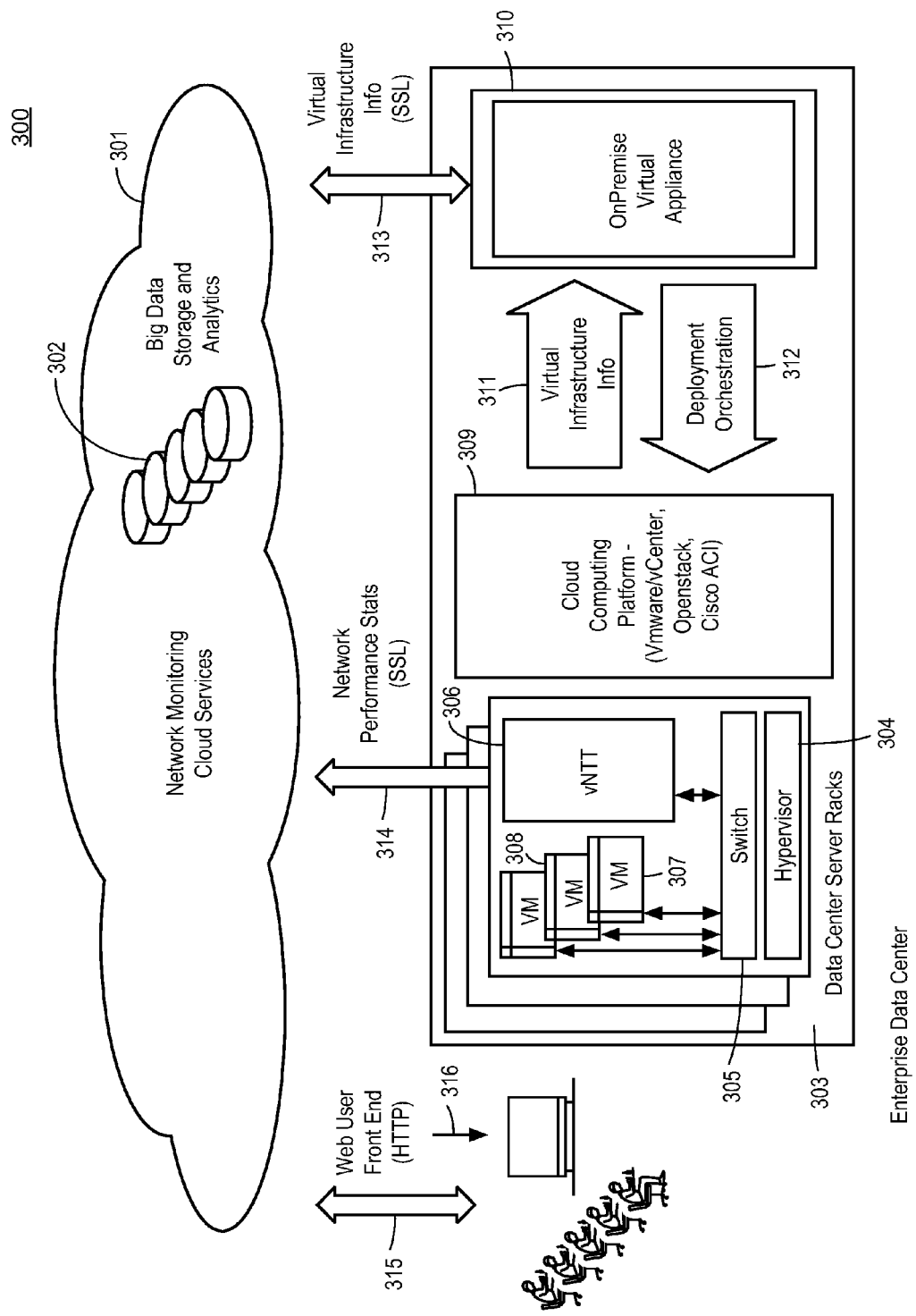
FIG. 3 shows a diagram illustrating an exemplary distributed infrastructure performance monitoring cloud (iDVM) structure for an enterprise data center according to one embodiment.

FIG. 3 shows a diagram illustrating an exemplary distributed virtual monitoring cloud (iDVM) structure 300 for an enterprise data center according to one embodiment. The iDVM structure 300 comprises a network monitoring cloud services 301 comprising a database to store network data and perform analytics. The iDVM structure 300 comprises an enterprise data center 303 having data center server racks on which a hypervisor 304 and virtual switch (vSwitch) 305 are operating. A plurality of VMs 307 are connected to vSwitch 305. A virtual network traffic tap (vNTT) 306 is connected to vSwitch 305 to tap traffic data 314 from the virtual network of the data center and to send traffic data 314 to network monitoring cloud server 301. In one embodiment, the information is sent via a secure protocol layer, which uses a cryptographic protocol to provide communication security over the Internet, to network monitoring cloud services 301 to provide network performance statistics data. The secure protocol layer can be, for example a secure socket protocol layer (SSL). Enterprise data center 303 comprises a cloud computing platform 309 (e.g., VMware, Openstack, Cisco ACI, or other cloud computing platform) and on premise virtual appliance 310. Cloud computing platform 309 is configured to send virtual infrastructure information 311 to on premise virtual appliance 310. In response to receiving the virtual infrastructure information, virtual appliance 310 sends deployment orchestration data 312 to cloud computing platform 309. On premise virtual appliance 310 forwards virtual infrastructure information 313 to network monitoring cloud services via a predetermined protocol layer, for example, a secure socket protocol layer (SSL).

The network monitoring cloud services 301 provide virtual network traffic monitoring data to a user display device 316 over a Web user front end layer 315, for example, Hypertext Transfer Protocol (HTTP) layer.

Figure 4A:
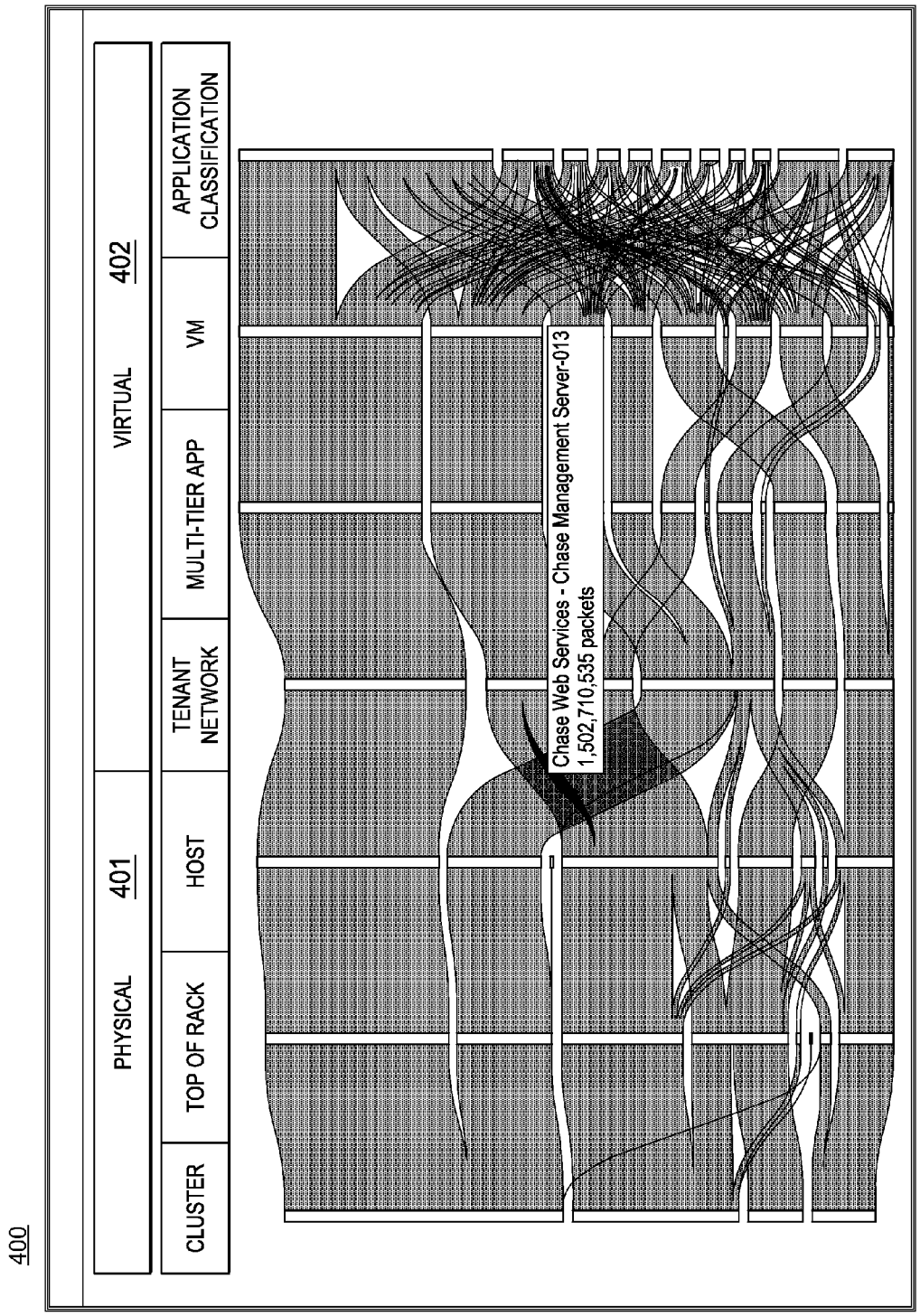

FIG. 4A shows a diagram 400 illustrating an example screen of a display device 401 displaying virtual traffic monitoring data according to one embodiment. In one embodiment, the network traffic data is grouped into groups, e.g., groups 402, 403, and 404 by mapping the network traffic flow to the virtual infrastructure, physical devices, or automatic application classification. In one embodiment, this occurs through DPI, where the vNTT generates records of vNIC-to-vNIC traffic volume by traffic classification (application type such as, for example, HTTP, FTP, etc.). By summarization of these records via the mapping table in FIG. 11, the graphic in FIG. 4A is built. In an embodiment, the virtual infrastructure comprises one or more vSwitches, port groups/tenants, VMs, vApps, or any combination thereof. In an embodiment the physical devices comprises one or more cluster, hosts, switches, or any combination thereof.

Referring to FIG. 4A, the visualization user interface for an infrastructure is divided among physical elements 401 and virtual elements 402. In one embodiment, physical elements 401 include clusters, top-of-rack (TOR) switches, and physical hosts, while virtual elements 402 include tenant networks, multi-tier virtual applications, VMs, and application classifications. Each of the elements is a heading in the visualization. Below each heading, a user can view flows that are occurring through a current set of elements. For example, under the cluster heading in FIG. 4A, four clusters associated with different application flows across the physical and virtual infrastructure are shown. Similarly, under the tenant network heading in FIG. 4A, there are five tenants shown and the application flows for those five tenants from their associated clusters, through TOR switches, physical hosts, virtual applications, VM virtual disks, and application classifications are depicted and can be viewed by a data center manager (or other user).

Note that the infrastructure depicted in FIG. 4A (as well as FIGS. 4B-1 to 4D-3) is obtained and aggregated by monitoring the infrastructure as described herein.

In one embodiment, the flow visualizations of the application flows are customizable. In one embodiment, the visualizations are made by selecting which physical and virtual infrastructure element an individual desires to view in the user interface.

Figures 1, 4B:
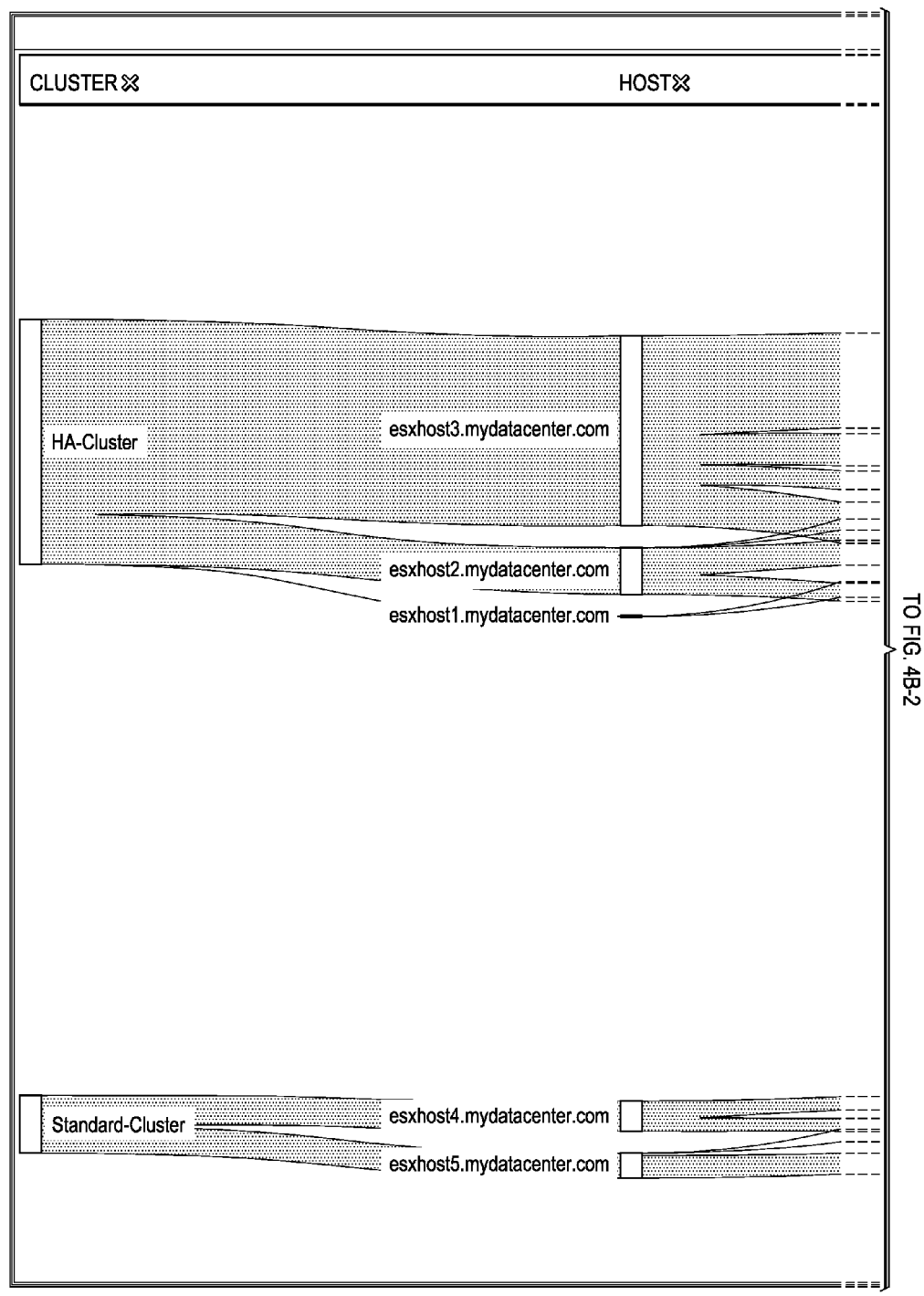
Figures 2, 4B:
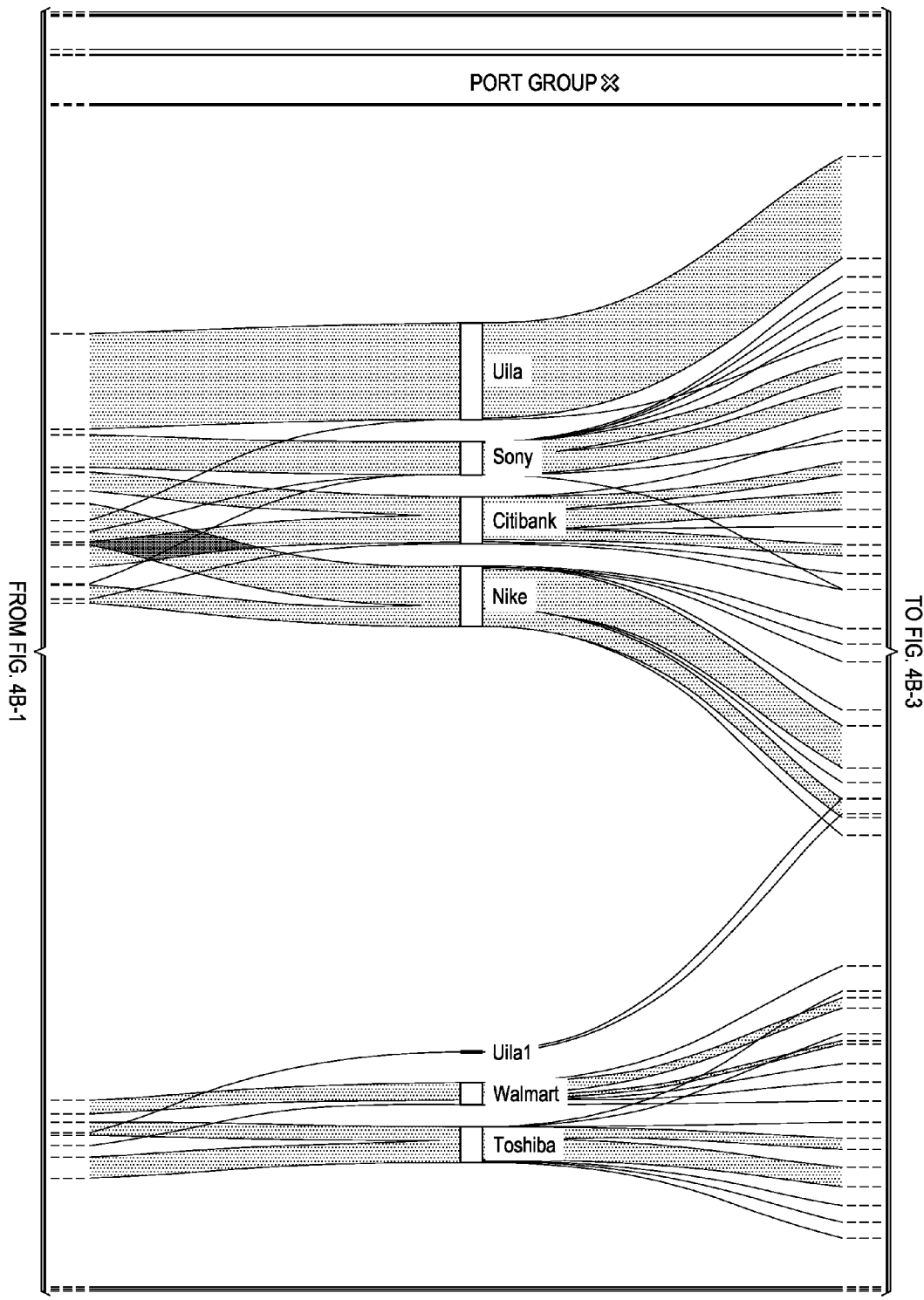
Figures 3, 4B:
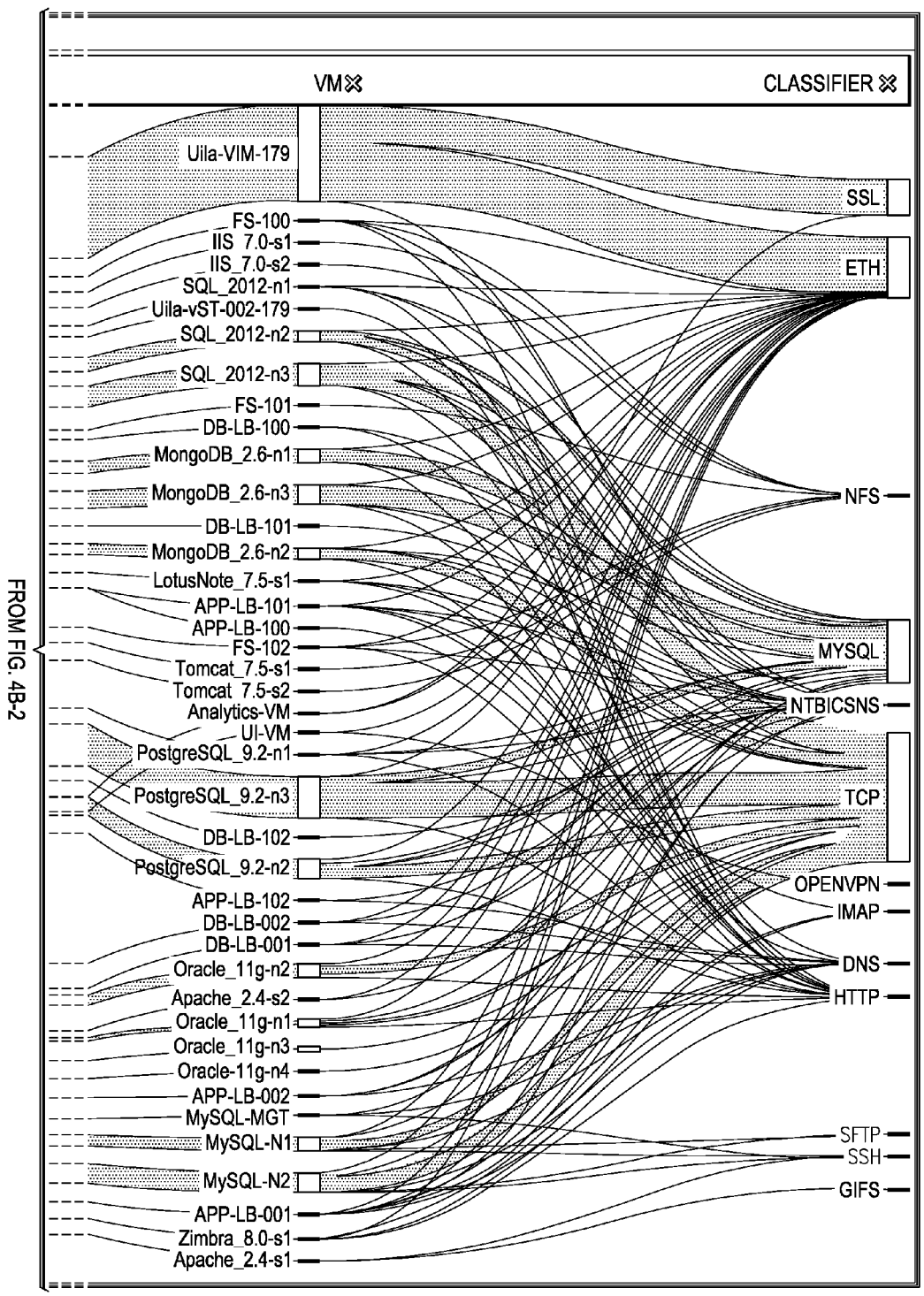
Figures 1, 4C:
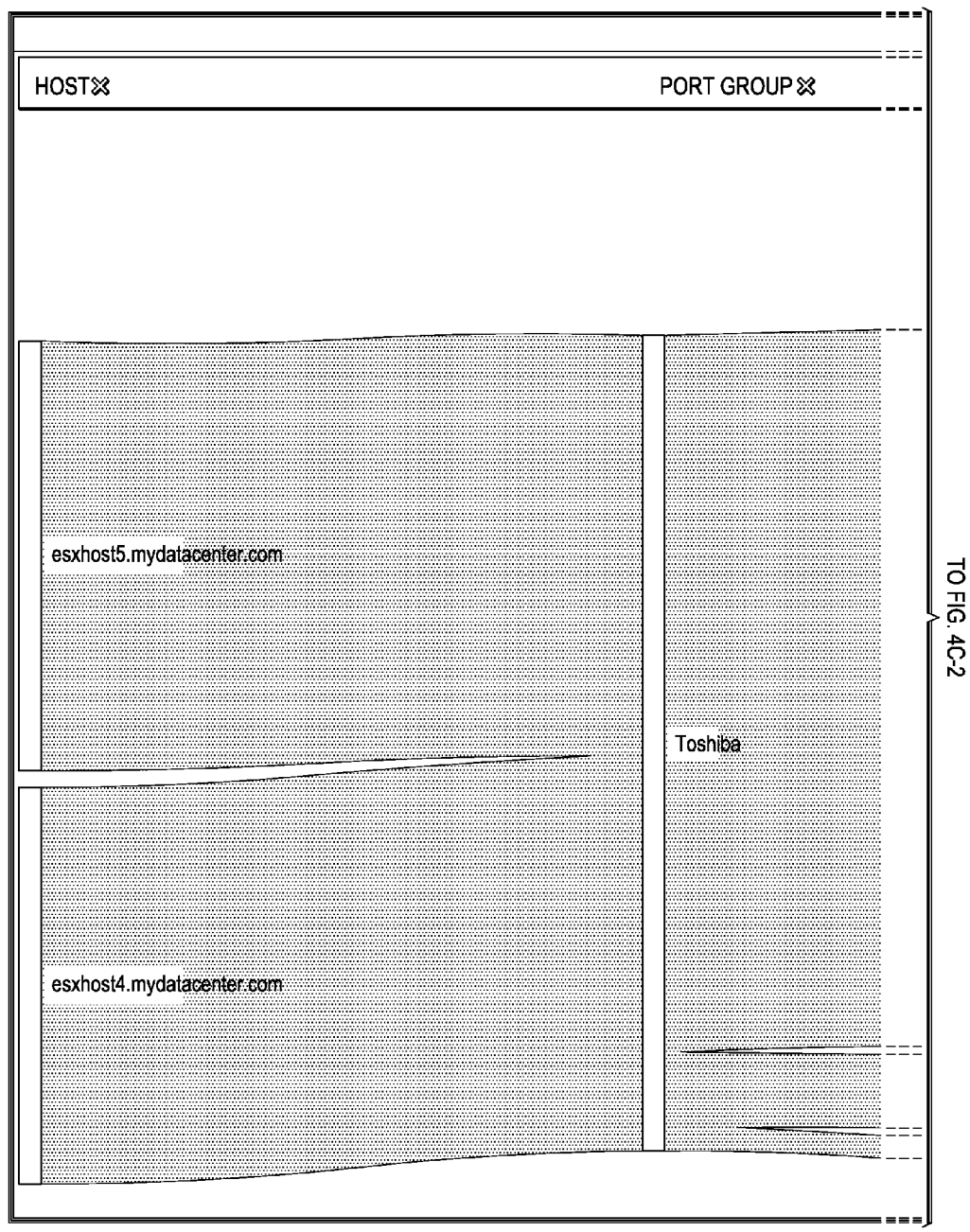
Figures 2, 4C:
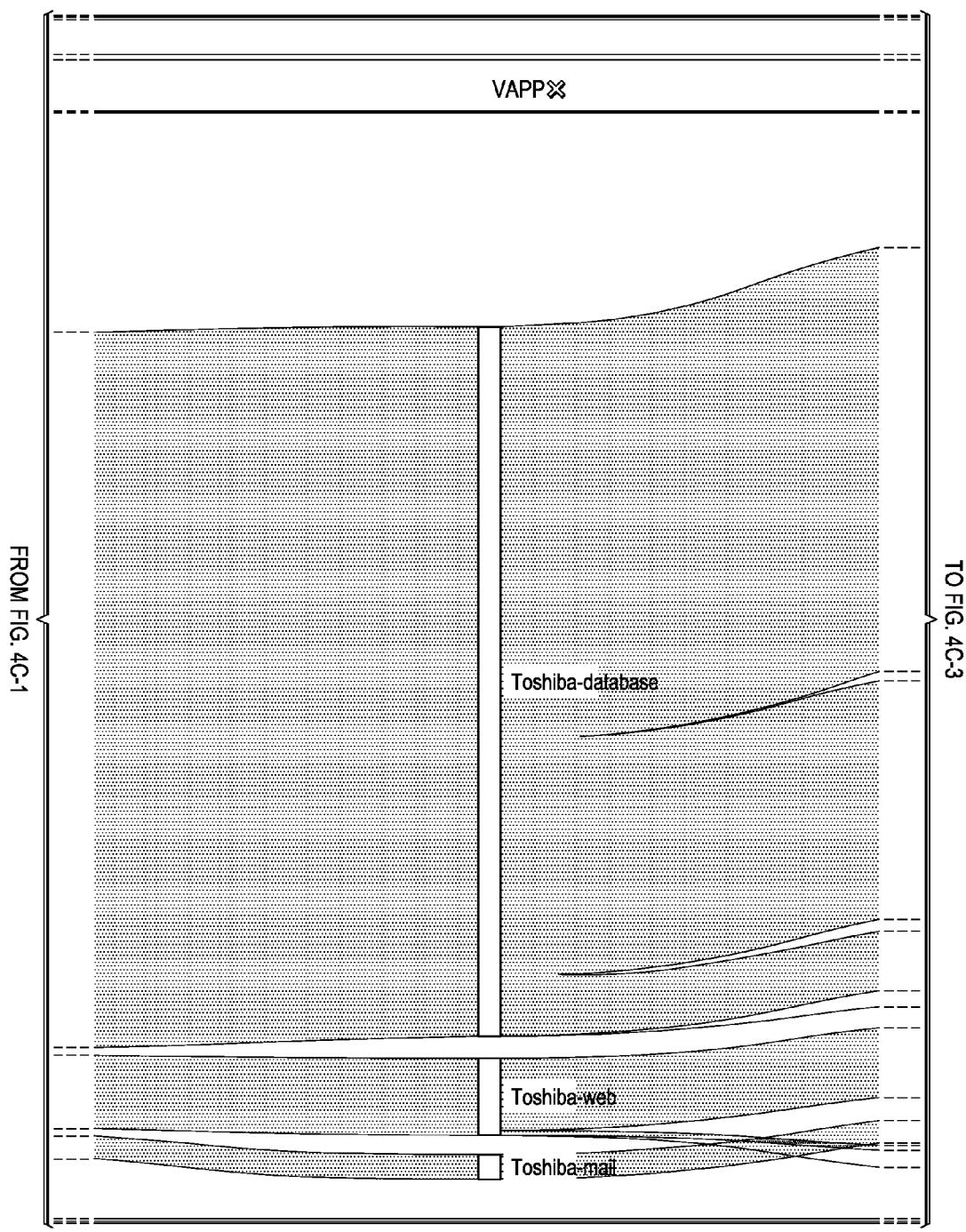
Figures 3, 4C:
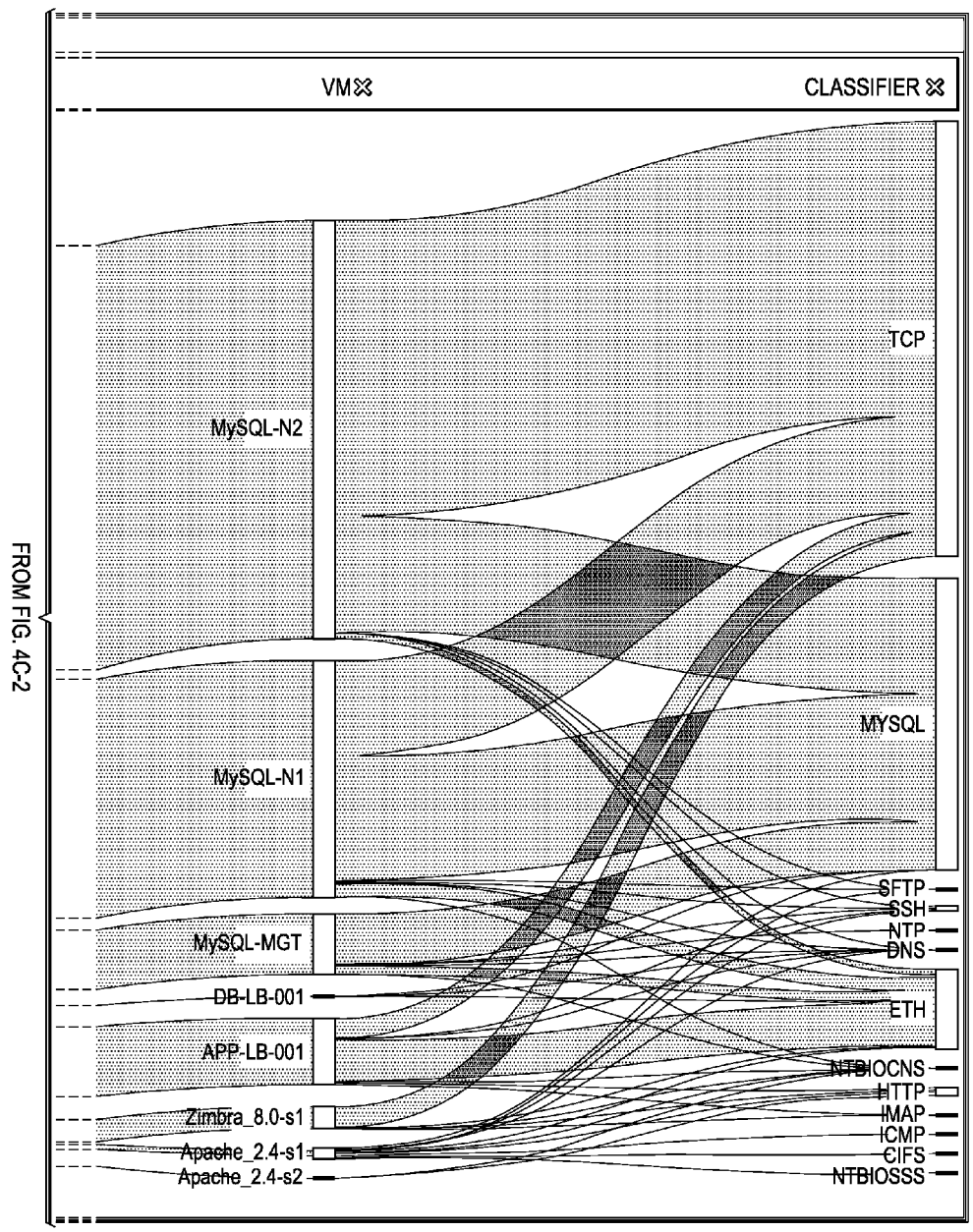
Figures 1, 4D:
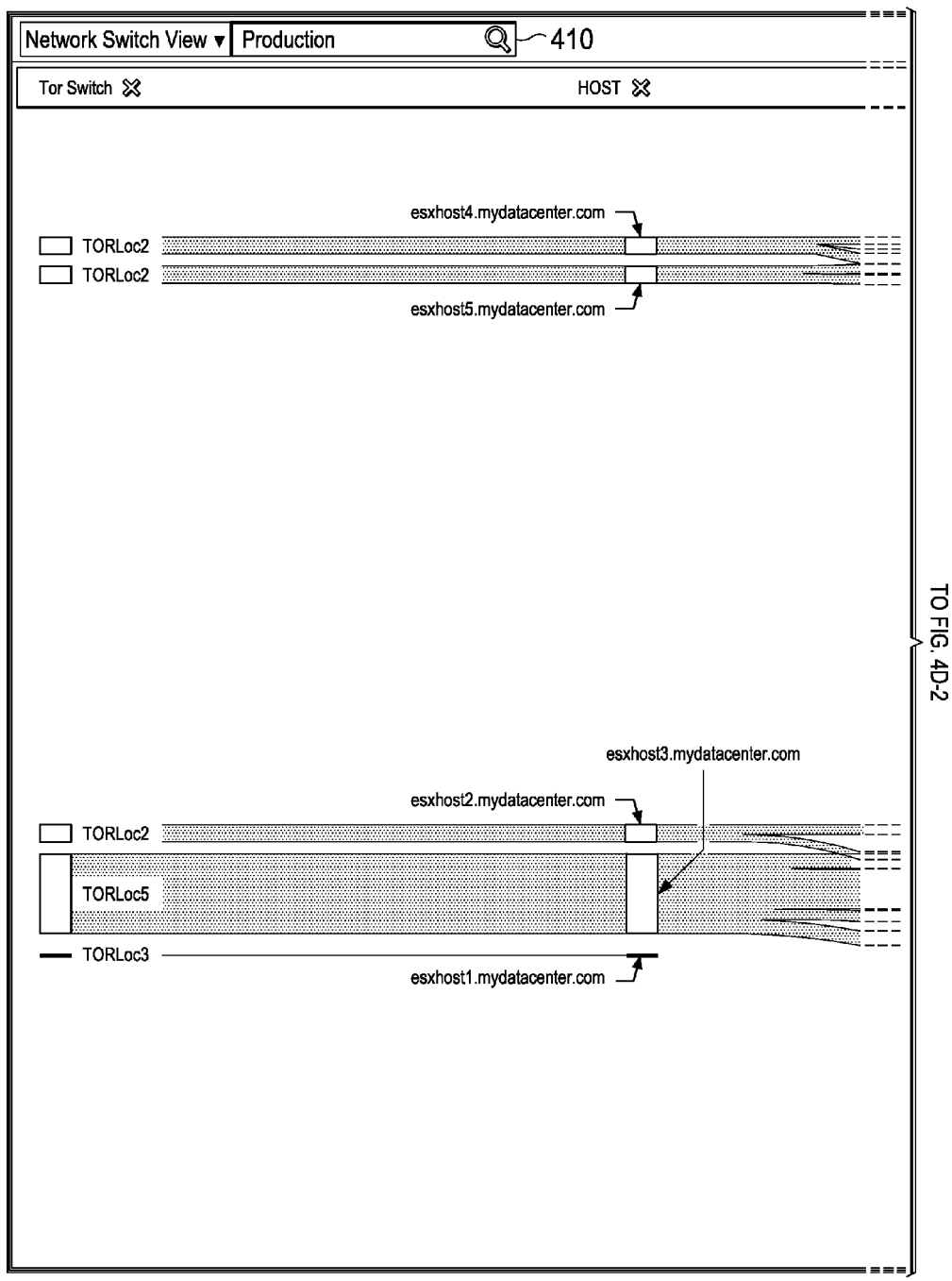
Figures 2, 4D:
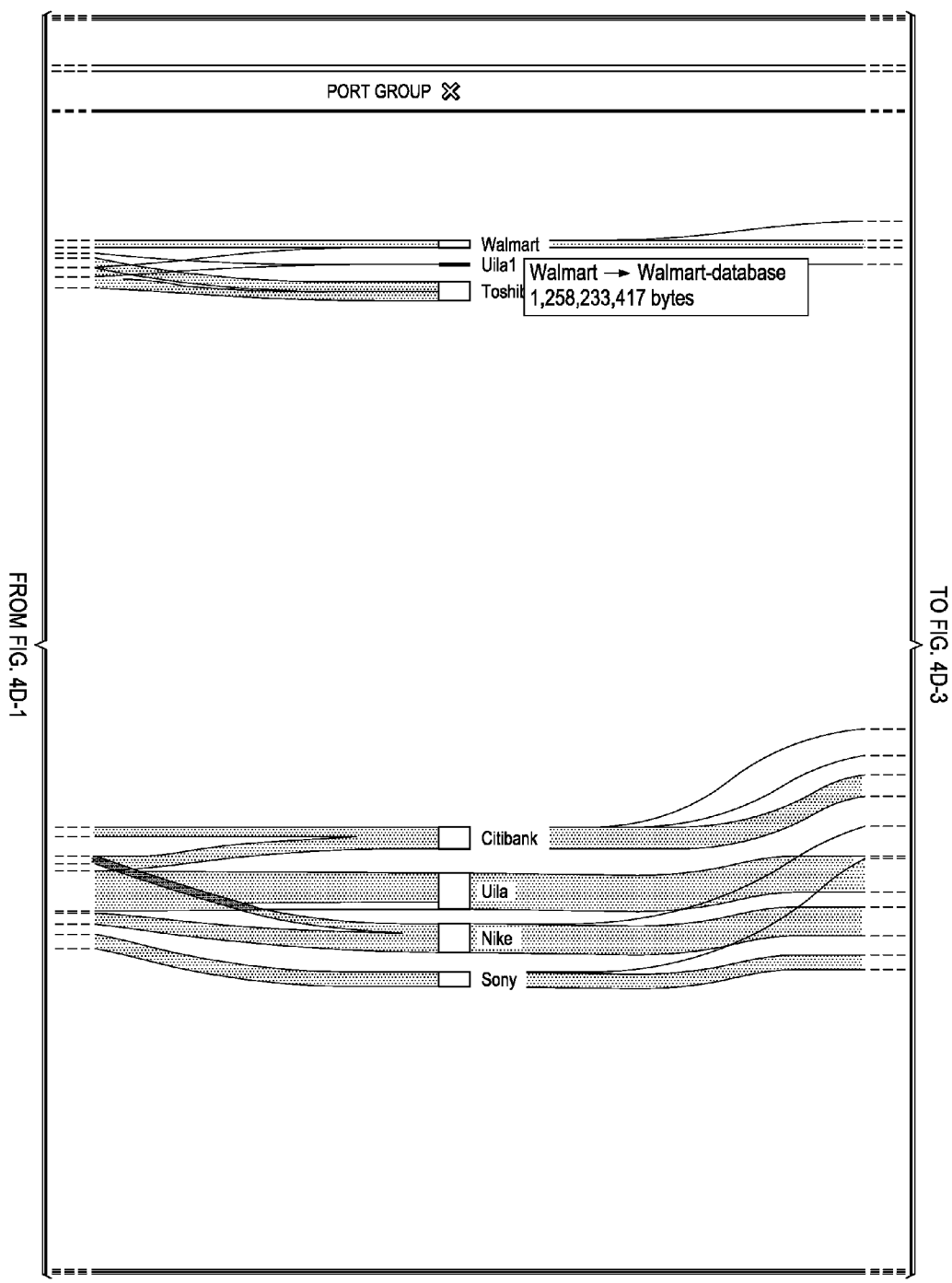
Figures 3, 4D:
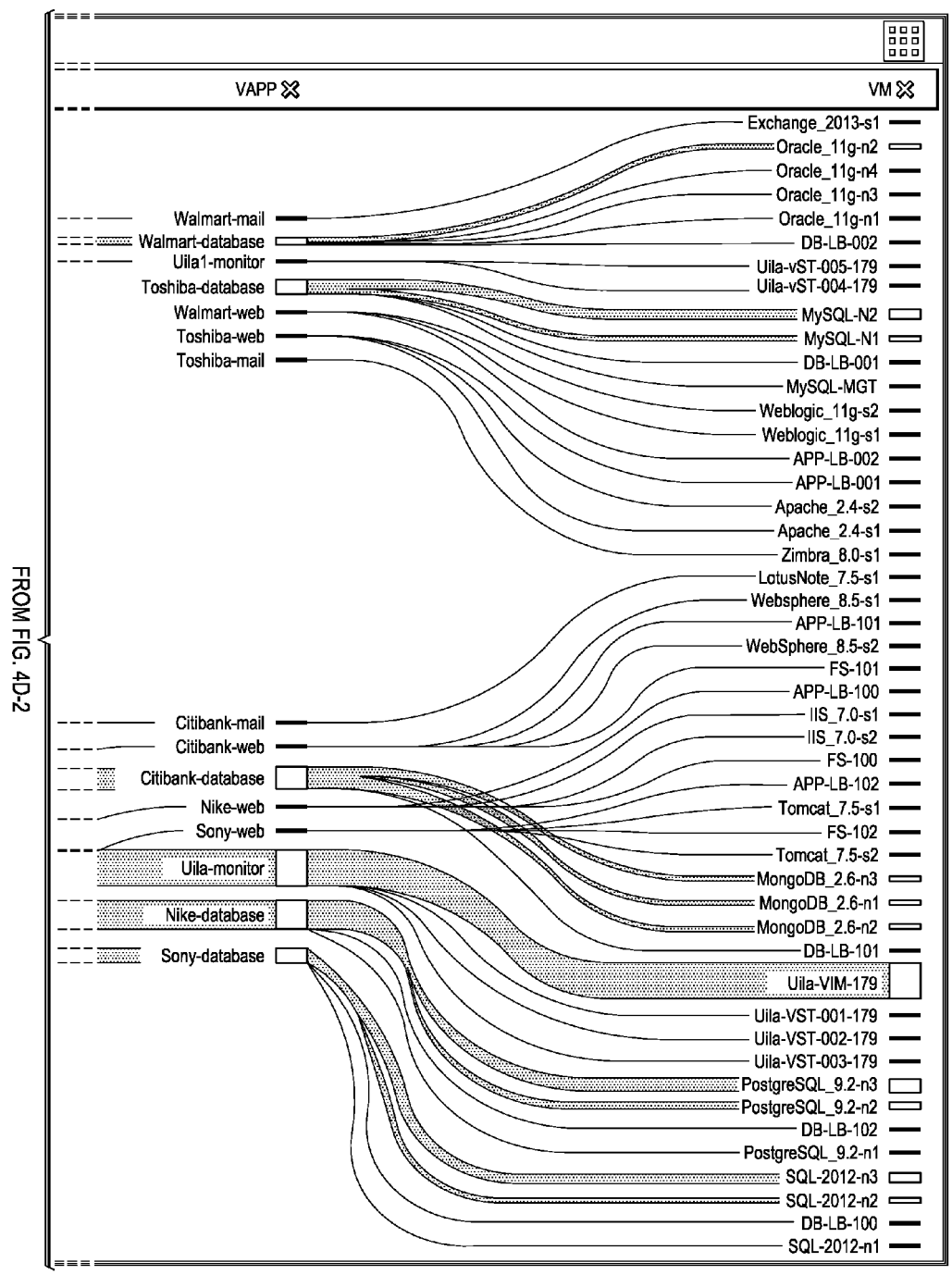

FIGS. 4B-1 to 4D-3 illustrate different visualizations for the application flows across physical and virtual infrastructure elements. Referring to FIG. 4B-1 to 4B-3, the infrastructure elements included in the visualization include clusters, physical hosts, port groups, VMs, and classifications (classifiers). Referring to FIG. 4C-1 to 4C-3, the infrastructure elements included in the visualization include physical hosts, port groups, virtual applications, VMs, and classifiers. Referring to FIG. 4D-1 to 4D-3, the infrastructure elements included in the visualization include TOR switches, physical hosts, port groups, virtual applications, and VMs.

To modify which elements are shown in the visualizations, a user selects the desired elements. The selection may include activating an "x" that appears next to each heading, causing that element to be removed from the view. In such a case, the flow is still depicted in the visualization but any division among deleted elements would not appear. In another embodiment, a drop down menu, such as menu 410 in FIG. 4D-1 to 4D-3, is used to select a particular prepopulated visualization or, alternatively, to select individual physical and/or virtual elements of the infrastructure to be depicted in the visualization.

Figure 13:
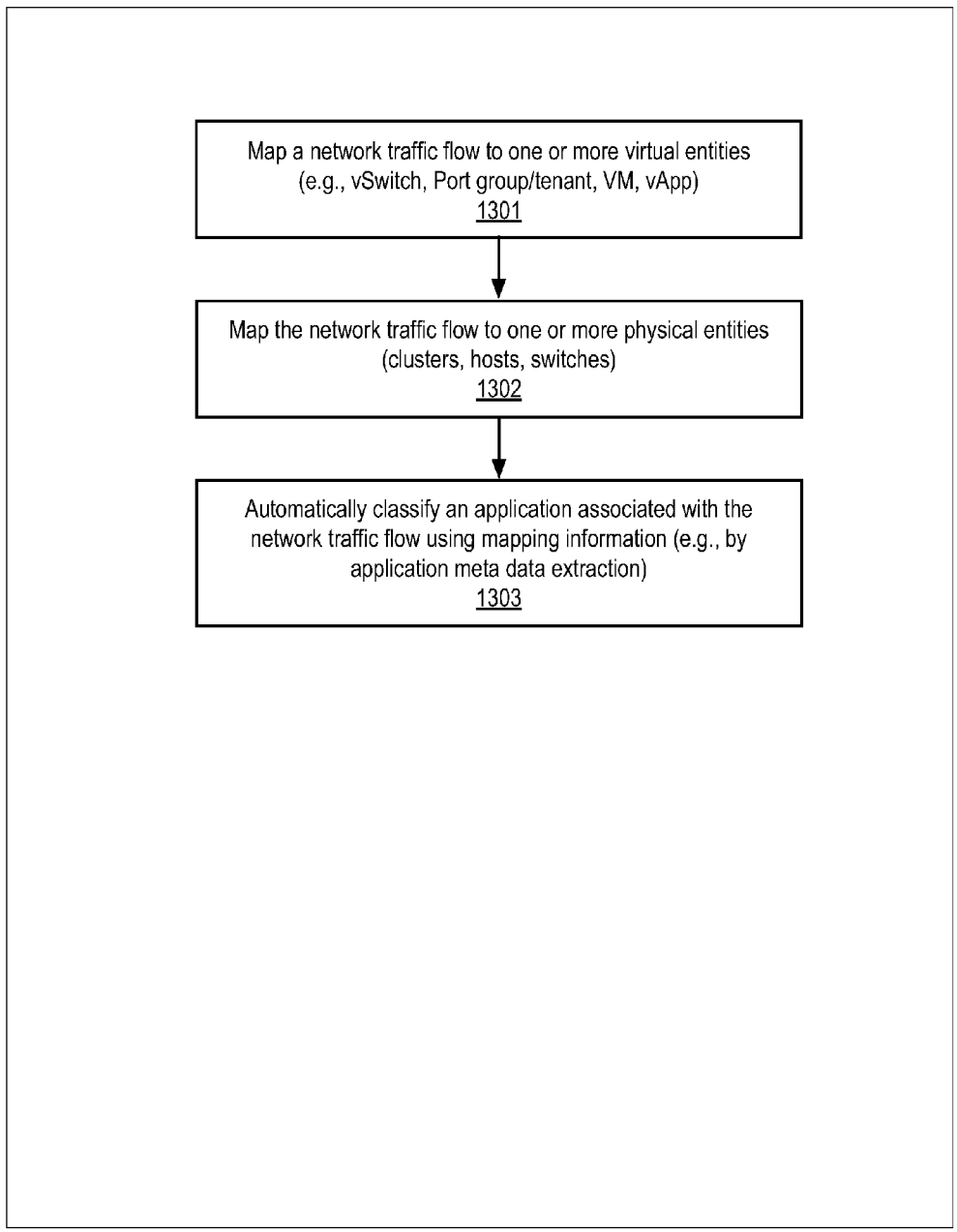
FIG. 13 is a flow diagram of one embodiment of a process for monitoring virtual network traffic.

FIG. 13 is a flow diagram of one embodiment of a process for monitoring virtual network traffic. The process is performed by processing logic that may comprise hardware (e.g., circuitry, dedicated logic, etc.), software (such as is run on a general purpose computer system or a dedicated machine), firmware, or a combination of all three.

Referring to FIG. 13, the process begins by processing logic mapping a network traffic flow to one or more virtual entities (e.g., vSwitch, port/group/tenant, VM, vApp, and other virtual entities) (processing block 1301). In at least some embodiments, mapping the traffic flow involves identifying the virtual entity from which the network traffic is originated.

After mapping the traffic flow, processing logic maps the network traffic flow to one or more physical entities (e.g., vSwitch, port/group/tenant, VM, vApp, and other virtual entities) (processing block 1302). In at least some embodiments, mapping the traffic flow involves identifying the physical entity from which the network traffic is originated.

Thereafter, processing logic classifies an application associated with the network traffic flow automatically classified using the mapping information (e.g., by application meta data extraction) (processing block 1303) In one embodiment, application classification is performed by vNTT at the DPI packet-by-packet level. DPI technology, which is well-known in the art, is able to identify the application protocol and thus can classify application. Classified application information is embedded in the vNIC-to-vNIC traffic records sent by the vNTT to one or more servers in the cloud. It should be noted that operations 1301, 1302, and 1303 may be performed in any order.

Figure 5:
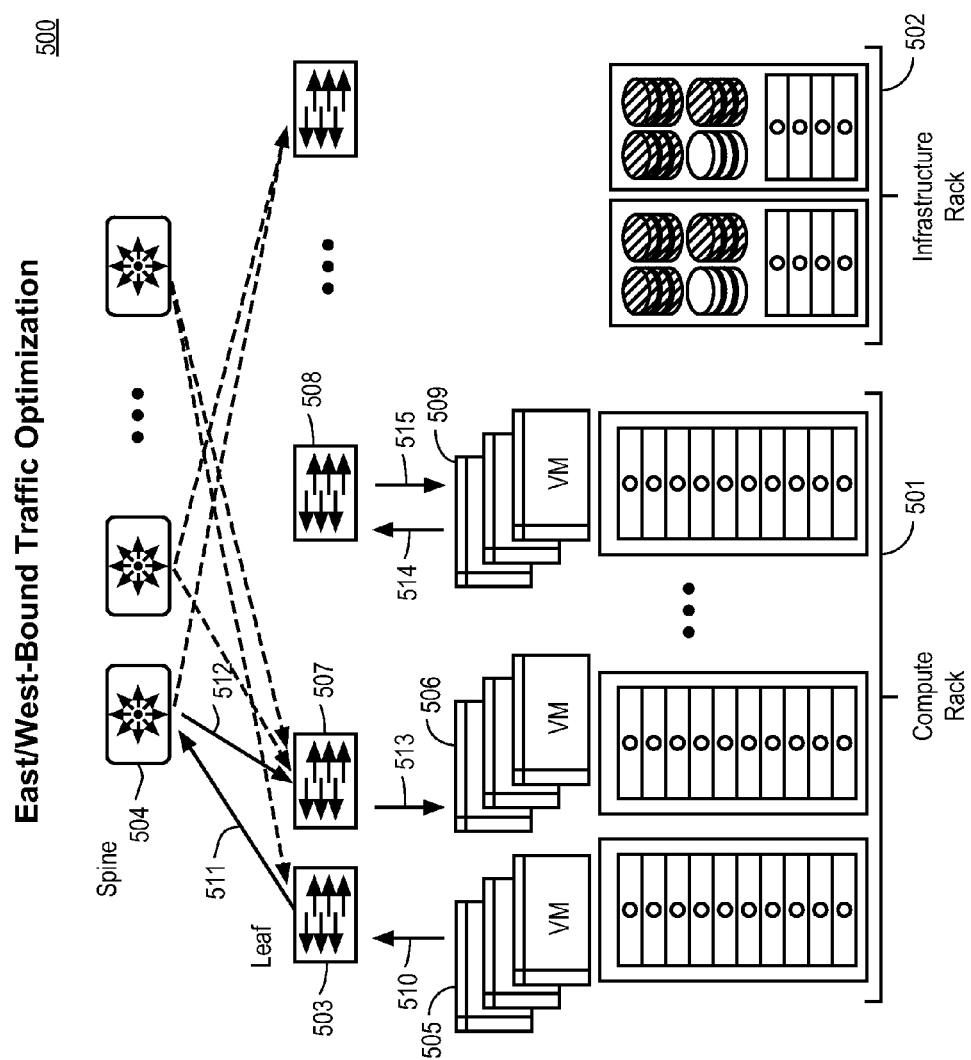
FIG. 5 shows a diagram illustrating a system to perform an east-west bound traffic optimization according to one embodiment.

FIG. 5 shows a diagram illustrating a system to perform an east-west bound traffic optimization 500 according to one embodiment. The system 500 comprises a plurality of compute racks 501 on which VMs, such as VMs 505, 506, and 509 are running. The system 500 comprises infrastructure racks 502 to operate the virtual network infrastructure data and to store the virtual network infrastructure data on physical disks, virtual disks, or both. In at least some embodiments, system 500 is a leaf-spine architecture system. In a leaf-spine architecture, a series of leaf switches, such as switches 503, 507, 508 form an access layer. These switches are meshed to a series of spine switches 504 forming an aggregation layer.

Figure 14:
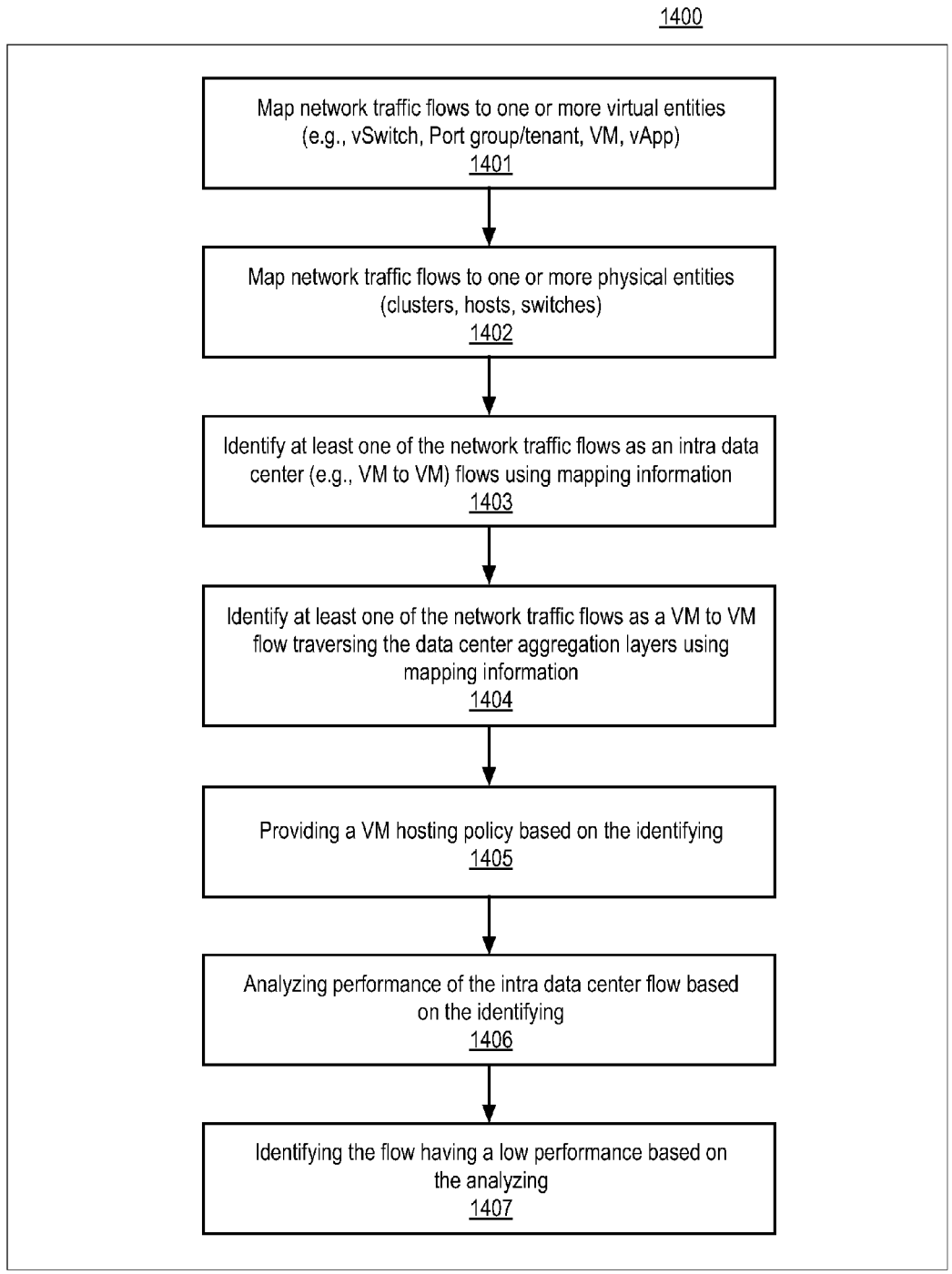
FIG. 14 is a flow diagram of one embodiment of a process for optimizing east-west bound traffic.

FIG. 14 is a flow diagram of a process for optimizing an east-west bound traffic according to one embodiment. The process is performed by processing logic that may comprise hardware (e.g., circuitry, dedicated logic, etc.), software (such as is run on a general purpose computer system or a dedicated machine), firmware, or a combination of all three.

Referring to FIG. 14, processing logic maps network traffic flows to one or more virtual entities (e.g., vSwitch, Port group/tenant, VM, vApp), as described above (processing block 1401) and maps network traffic flows to one or more physical entities (e.g., clusters, hosts, switches), as described above (processing block 1402). Then, processing logic identifies at least one of the network traffic flows as an intra data center (e.g., VM-to-VM) flow using mapping information (processing block 1403) and as a VM-to-VM flow traversing the data center aggregation layers using mapping information (processing block 1404).

Referring back to FIG. 5, intra data center VM-to-VM flows, e.g., flows 510, 511, 512, 513, 514, and 515 are identified using the mapping information. As shown in FIG. 5, the VM-to-VM flows that traverse the data center, such as flows 510, 511, 512, 513, are identified using the mapping information and highlighted. More specifically, using the vNTT generated vNIC-to-vNIC traffic records, VM-to-VM traffic is derived, particularly using knowledge that the two VMs are on the same rack or not by looking into a Top-of-Rack-switch-To-Host mapping table. If the two VMs are not on the same rack, the VM-to-VM traffic will go through spine switch 504.

Referring back to FIG. 14, at operation 1405, a VM hosting policy is provided based on the identified VM-to-VM flows. In at least some embodiments, the east-west bound traffic optimization involves advising on VM hosting policy by network usage. At operation 1406, the performance of the intra data center flow is analyzed based on the identified policy. At operation 1407, the VM-to-VM flow that has a low performance is identified from analyzing the inter data center flow. In at least some embodiments, the performance analysis of the east-west bound (VM-to-VM) traffic involves identification of hot spots (e.g., identification of the VM that has lowest performance).

Figure 15:
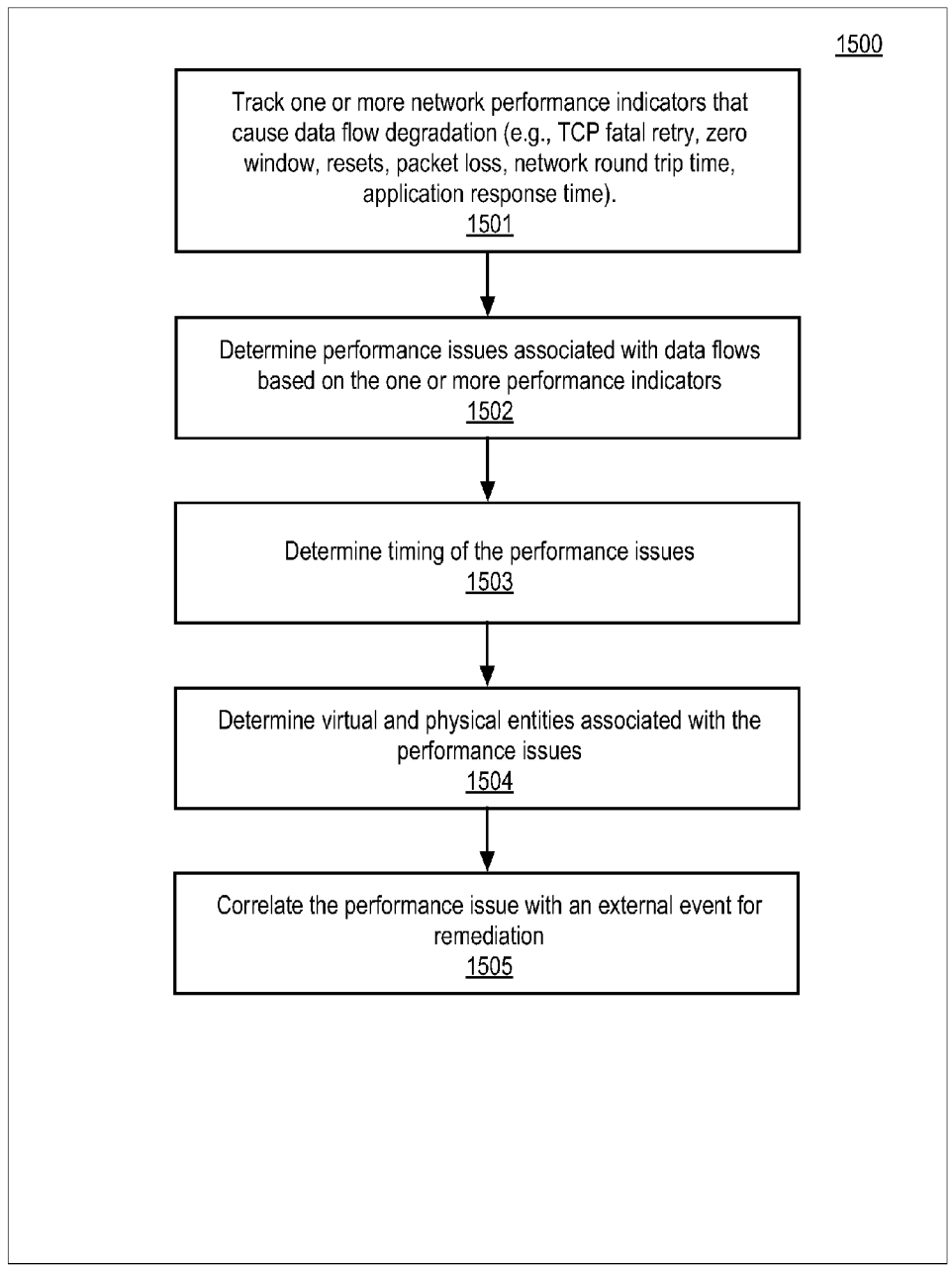
FIG. 15 is a flow diagram of one embodiment of a process for performing a network performance analysis.

FIG. 15 is a flow diagram of a process for perform a network performance analysis according to one embodiment. The process is performed by processing logic that may comprise hardware (e.g., circuitry, dedicated logic, etc.), software (such as is run on a general purpose computer system or a dedicated machine), firmware, or a combination of all three.

Referring to FIG. 15, the process begins with operation 1501 involving tracking one or more network performance indicators that may cause data flow degradation. The network performance indicators that may cause the data flow degradation can be, for example, a TCP fatal retry, a zero window, resets, a packet loss, a network round trip time, an application response time. At operation 1502, performance issues associated with the data flows are determined based on the one or more performance indicators. For example, degradation of the network traffic flow can be determined when a value the performance indicator (e.g., a number of resets) exceeds a predetermined threshold. At operation 1503, a time when the performance issues is determined. For example, time at which the degradation of the network traffic flow occurs is stored in a memory. At operation 1504, at least one of the virtual and physical entities associated with the performance issues are determined. For example, at least one of the virtual entities, physical entities, or both from which the degraded network traffic flow is originated are identified. At operation 1505, the performance issue is correlated with an external event for remediation. In at least some embodiments, involves correlating the performance issues by time and devices (virtual and physical) with external events for remediation.

Figure 10:
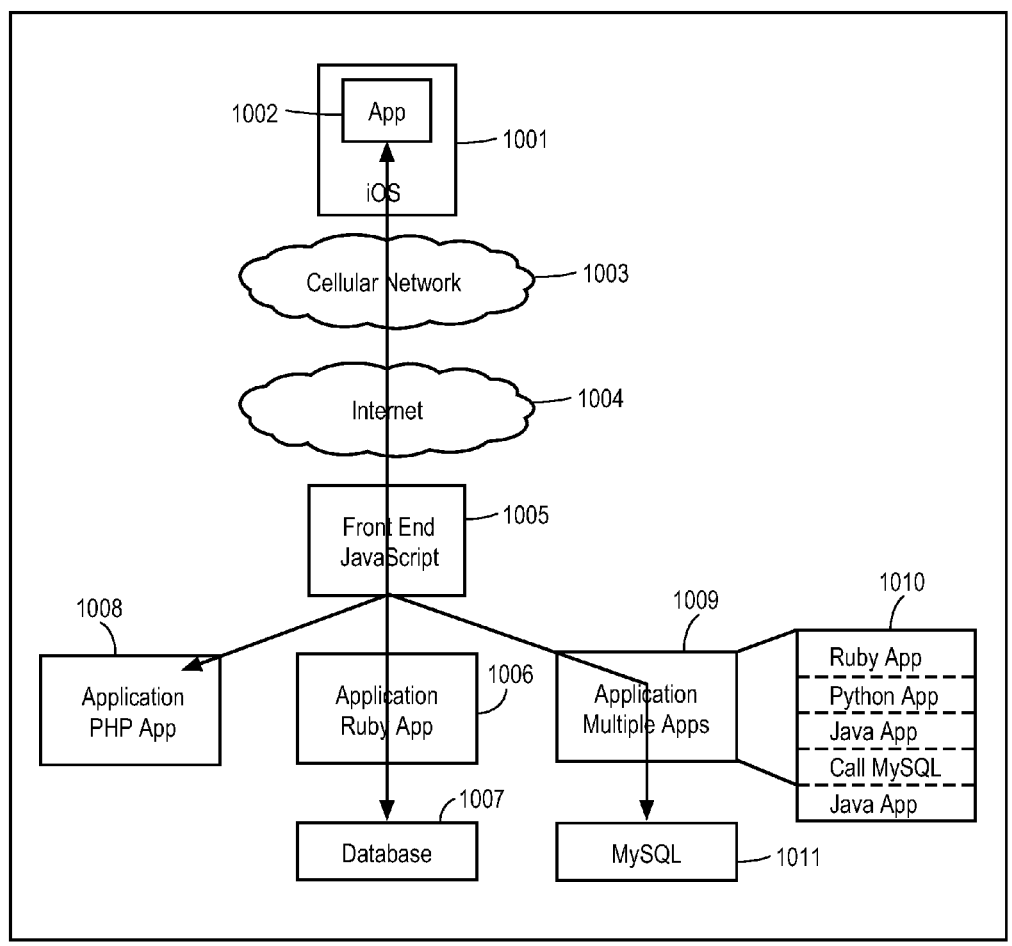
FIG. 10 is a diagram illustrating an exemplary application performance monitoring (APM) system and the components the APM system is tracking according to one embodiment.

FIG. 10 is a diagram illustrating an exemplary application performance monitoring (APM) system 1000 and the components being tracked by the APM system according to one embodiment. Referring to FIG. 10, APM system 1000 comprises an application 1002 running in conjunction with an operating system 1001. Application 1002 is running on a device that is communicably coupled to a network 1004 (e.g., the Internet) via cellular networks 1003 to communicate with a front end 1005 (e.g., JavaScript). Application 1002 communicates with front end 1005 to gain access to application 1006 (e.g., a Ruby application), application 1008 (e.g., a PHP application), and application 1009 (e.g., multiple applications, such as a Ruby application, a Python application, a Java application, a Call MySQL application, and other application). These applications provide access to database 1007 and MySQL storage 1011.

Figure 16:
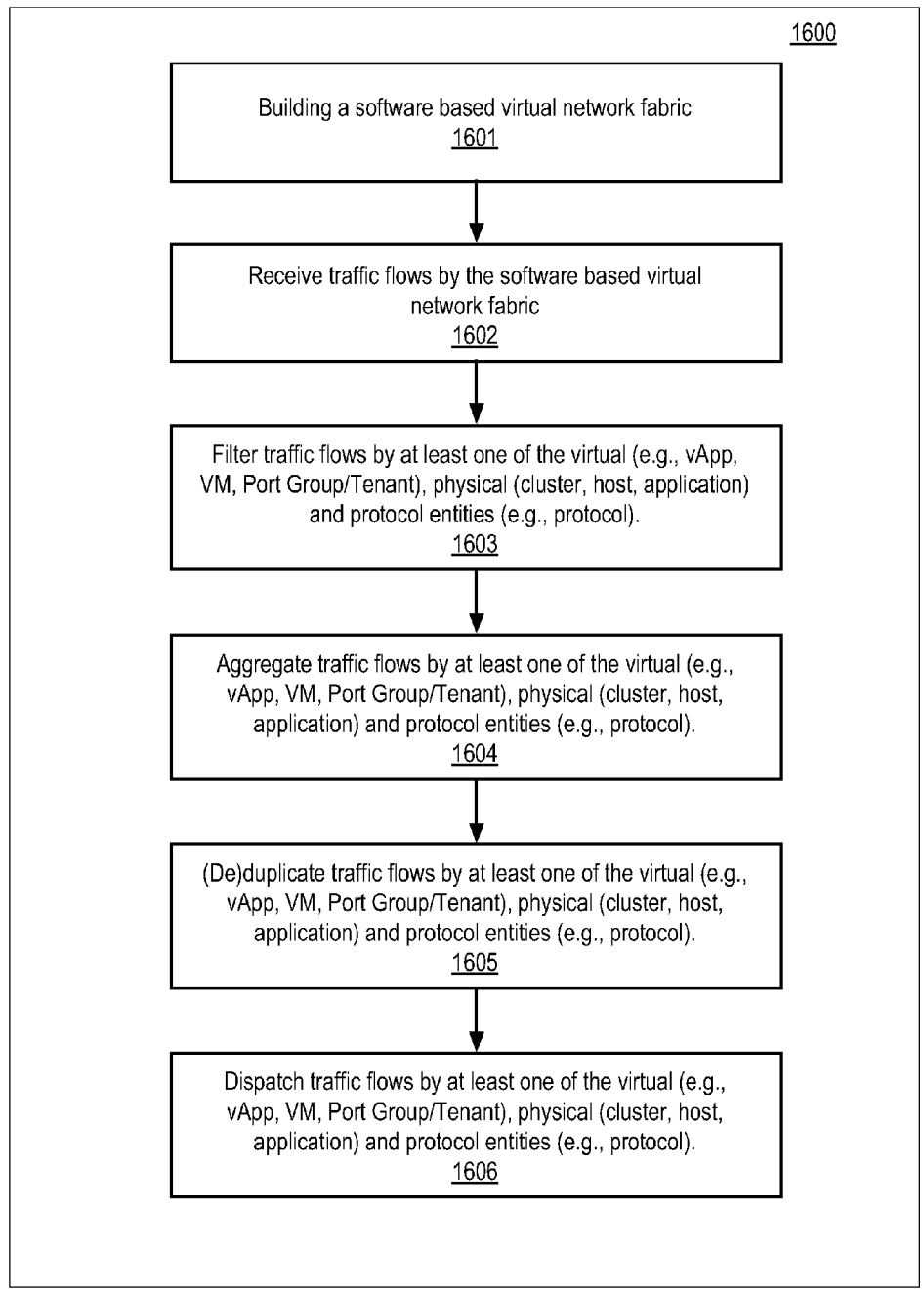
FIG. 16 is a flow diagram of one embodiment of a process for providing a network packet broker.

FIG. 16 shows a flowchart of a method provide a network packet broker according to one embodiment. The process is performed by processing logic that may comprise hardware (e.g., circuitry, dedicated logic, etc.), software (such as is run on a general purpose computer system or a dedicated machine), firmware, or a combination of all three.

Referring to FIG. 16, at operation 1601, a software based virtual network fabric is installed. In at least some embodiments, the software based virtual network fabric is a network packet broker (vNPB). In at least some embodiments, the vNPB is an overlay network management fabric to interconnect network monitoring and security tools. At operation 1602, traffic flows are received by the software based virtual network fabric. At operation 1603, the traffic flows are filtered by virtual entities, physical entities, protocol entities, or any combination thereof entities. The virtual entities can comprise, for example, a vApp, a VM, a port group/tenant. The physical entities can comprise, for example, a cluster, a host, an application. The protocol entities can comprise for example, a communication protocol. At operation 1604, the traffic flows are aggregated according to the virtual entities, physical entities, protocol entities, or any combination thereof entities. At operation 1605, the traffic flows are (de) duplicated by the virtual entities, physical entities, protocol entities, or any combination thereof entities. At operation 1606, the traffic flows are dispatched by the virtual entities, physical entities, protocol entities, or any combination thereof entities.

Figure 7:
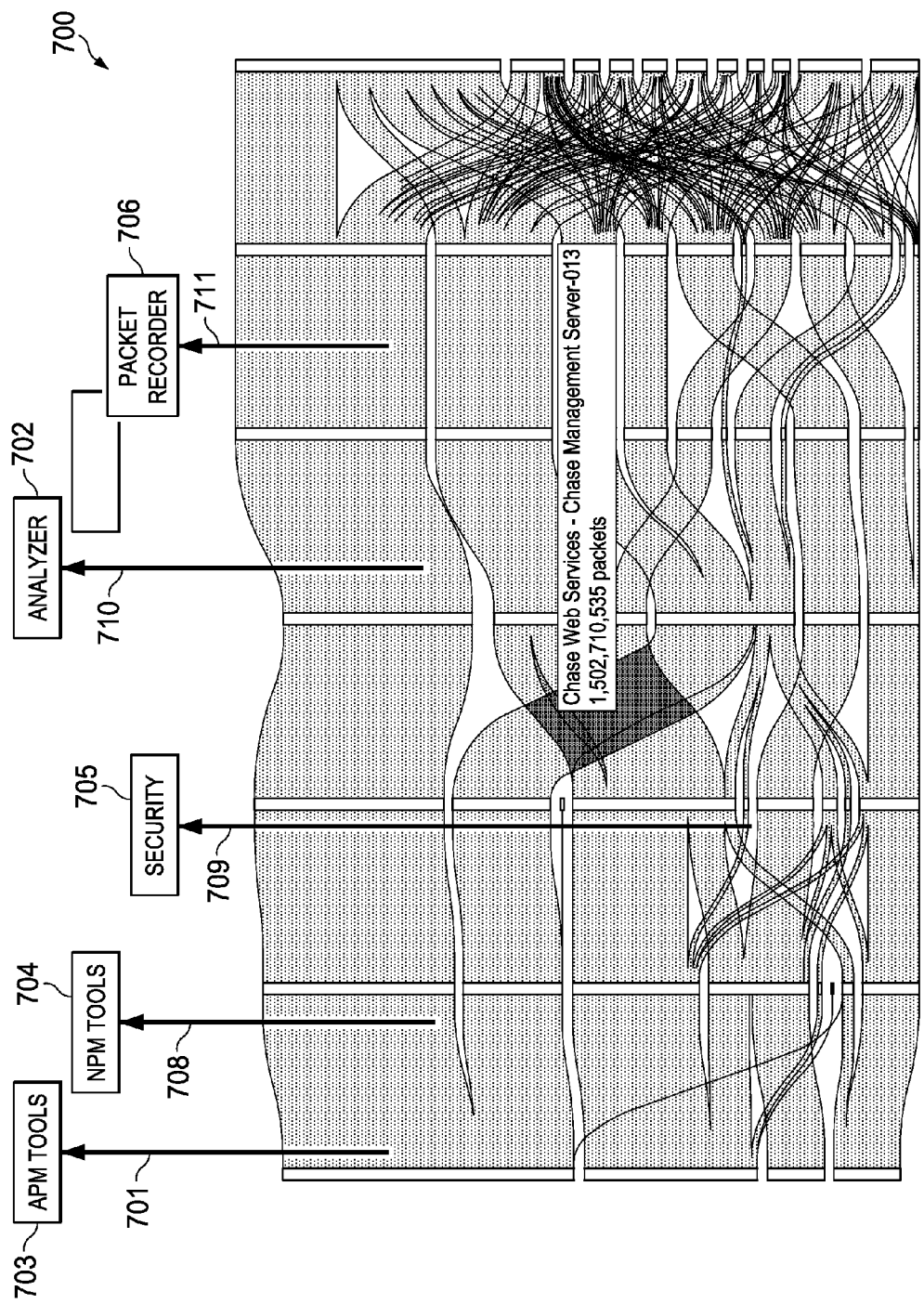
FIG. 7 shows a diagram illustrating operation of an exemplary virtual network packet broker according to one embodiment.

FIG. 7 shows a diagram 700 illustrating operation of an exemplary virtual network packet broker according to one embodiment. Diagram 700 shows a screen 401 displaying virtual traffic monitoring data as depicted in FIGS. 4A to 4D-3 and 6. As shown in FIG. 7, traffic flow 701 is dispatched to APM tools 703, traffic flow 708 is dispatched to NPM tools 704, traffic flow 709 is dispatched to a security monitor 705, and traffic flow 710 is dispatched to an analyzer 702 to undergo analysis.

Infrastructure Performance Monitoring Visualizations

As discussed above, techniques described herein include a method and apparatus for infrastructure performance monitoring. The infrastructure comprises both physical and virtual components. In one embodiment, the method comprises monitoring application performance, grouping statistics regarding the virtual and physical infrastructure, identifying degradation in the application performance, correlating the degradation to one or more of virtual and physical infrastructure components, and generating visualization analytics corresponding to the group statistics.

In one embodiment, correlating the degradation is performed based on compute, storage, and network statistics. In one embodiment, statistics are grouped by virtual entity type (e.g., port group, data store, etc.).

In one embodiment, the visualization analytics comprise a user interface that depicts application flows across the infrastructure of physical and virtual components. In one embodiment, the user interface illustrates flow-by-flow through the groups of physical and virtual components of the infrastructure.

In one embodiment, the system provides information in the form of visualizations, or graphical user interfaces (GUIs), to a data center manager or other user to show application performance throughout the system. In one embodiment, the visualizations of application performance can be viewed by a data center manager and allow the data center manager the ability to determine if problems related to poor performance are associated with virtualized networking, a virtualized computer, or virtualized storage. That is, the visualizations allow the data center manager to drill down further into areas in which the problem resides to determine if the problem is associated with a physical part of the shared resources or a virtual part of the resources.

In one embodiment, the statistics depicted that are obtained and used for the virtualizations, via aggregation or a single instance, are provided by the virtualized infrastructure. In one embodiment, the virtualized infrastructure uses one or more of VMWare, OpenStack, ICBM, or Microsoft Hyper-V, and queries are made to obtain the compute and storage statistics. The compute and storage statistics include statistics related to both the virtual and physical layers.

In one embodiment, when the storage statistics are collected and aggregated, statistics are based on the input/output (I/O) delay, either on the virtual side or the physical side. In one embodiment, with compute statistics, two statistics are monitored, namely CPU usage and memory usage. For CPU usage, the statistics being monitored indicate the length of time the virtual machine is waiting for the CPU to be ready. For memory usage, the statistics being monitored indicate the amount of swapping that occurs. In one embodiment, counters are maintained for use in tracking these statistics.

Once received, the statistics regarding the physical and virtual infrastructure are mapped and aggregated. In one embodiment, the mapping and aggregating are performed according to the virtual structure to which they are associated.

In one embodiment, the statistics being monitored and collected are compared to a baseline. When the collected statistics stored in the physical and virtual counters differ from the baseline by a threshold amount (e.g., the counters fall below the baseline), then the application performance is determined to have an issue. In one embodiment, the physical and virtual elements of the infrastructure are graded. The different grades may be indicated by different colors in the visualization. In one embodiment, portions of the visualization that are colored one color (e.g., red) indicate the infrastructure entity (or entities) being monitored has a critical performance problem, portions of the visualization that are colored in another color (e.g., orange) indicate the infrastructure entity (or entities) being monitored has a major performance problem, portions of the visualization that are colored yet another different color (e.g., yellow) indicate the infrastructure entity (or entities) being monitored has a minor performance problem, and those colored in green indicate the infrastructure is performing normally, where all the grades are with respect to a baseline.

In one embodiment, the grade, or color, that is assigned is based on the comparison of the current performance against a baseline performance metric with different grades assigned according to the amount the performance is above or below the baseline performance metric (e.g., red/critical performance problem represents performance that is 20% over the baseline performance metric, orange/major performance problem represents performance that is 10% over the baseline performance metric, yellow/minor performance problem represents performance that is 5% over the baseline performance metric, and green/normal performance represents performance that is 5% below the baseline performance metric).

In one embodiment, the baseline performance metric is a fixed defaulted value. In one embodiment, the fixed default value is the value of the performance at a particular time (e.g., the performance of the infrastructure the first week after deployment, the performance of the infrastructure at another week (e.g., the previous week's performance), day, month, less than 24 hour period, etc.). In another embodiment, a sliding window is used to select the baseline performance metric (e.g., the previous week's performance is used as the baseline for the current week).

Note that other types of grades (e.g., letter grades, number grades, grades depicted by different pictures or animations) may be used.

The performance monitoring system generates one or more visualizations of the shared resources using the mapped and aggregated data. For example, a visualization can show the number of physical hosts, virtual machines, or virtual port group or tenant that is using a physical disk.

The aggregated information displayed in the visualizations may be useful in identifying problems. For example, if the application performance indicates there is a problem and the data center manager can see that three applications share a large number of virtual machines to deliver their application services and that all of the virtual machines use the same physical disk, the data center manager may conclude that there is physical disk resource contention that may be causing the application performance issues.

The ability to present visualizations that provide various levels of aggregation can enable a data center manager to identify other useful information. For example, for an individual port group that uses a predetermined number (e.g., seventeen) different physical disks and a predetermined number (e.g., fifteen) of virtual disks, the visualization allows the data center manager to see the virtual and physical disk performance for the port group.

In one embodiment, the visualization comprises graphs that include an aggregation of data from the compute and storage statistics, and various information for the virtual application.

Figure 18:
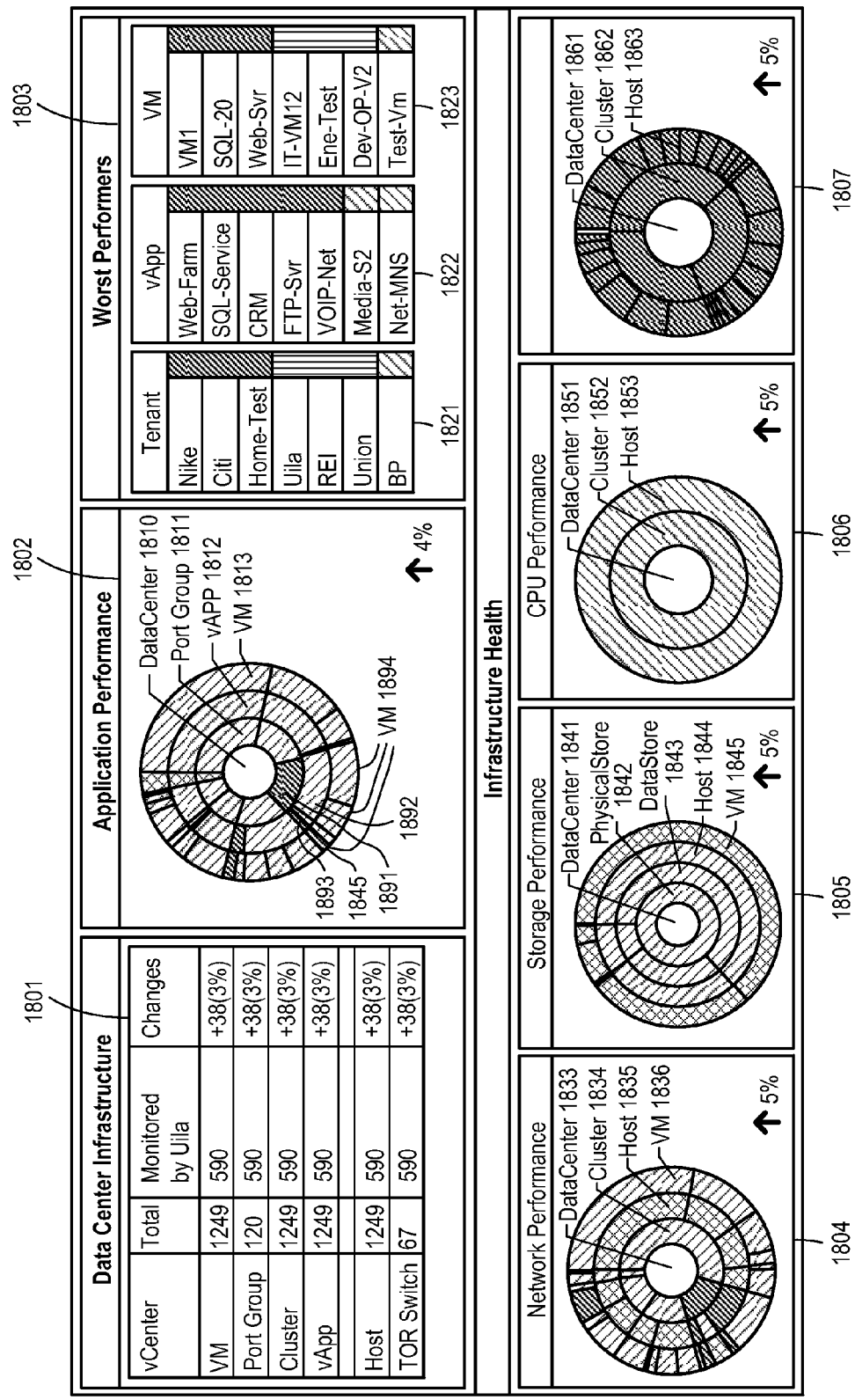
FIG. 18 illustrates one embodiment of a user interface for infrastructure performance monitoring.

FIG. 18 illustrates one embodiment of a user interface for infrastructure performance monitoring. Referring to FIG. 18, seven windows 1801-1807 are shown. Data center infrastructure window 1801 provides an overview of the data center infrastructure specifying the total number of virtual machines (VMs), port groups, clusters, virtual applications, hosts, and top of rack (TOR) switches, as well as an indication of the number that are monitored by the performance monitoring system. In one embodiment, also provided is an indication of the amount of change as a percentage of those that were monitored previously and are monitored now.

Application performance window 1802 illustrates the application performance for the virtualized infrastructure being monitored. In one embodiment, the application performance is a direct measurement of Application Response Time from application server to application transaction requests. In one embodiment, the measurement is performed by analyzing network packets (e.g., deep packet inspection) and is independent of any measurement of network, storage, CPU and memory (which do impact the application performance).

In one embodiment, the application performance is visualized in the form of a series of rings. Inner DataCenter ring 1810 specifies the data center. PortGroup ring 1811 is divided according to port group. vApp ring 1812 specifies the virtualized applications and ring 1813 specifies the VMs. Each of the rings is segmented based on which data center, port group, virtualized application, and virtual machine is being monitored, respectively. For example, DataCenter ring 1810 includes a Toshiba port group 1891 that includes a Toshiba-DA virtualized application 1892 and another virtualized application 1893. The Toshiba-DA virtualized application 1892 is supported by three VMs 1894. Thus, in this case, the application performance of the three VMs 1894 for the Toshiba-DA virtualized application 1892 for the Toshiba port group 1891 can be viewed.

As shown, each of the rings is colored, or graded (represented by different fill patterns). In the example shown, the color green is used to indicate normal performance with respect to the baseline and red is used to indicate a critical problem in application performance. For example, the Toshiba port group 1891 is colored in red/critical performance problem (using a forward slash fill pattern, which is used to represent a grade of red/critical throughout FIG. 18) along with a virtualized application 1893 that is part of the Toshiba port group 1891, as well as VM 1895. Thus, since they are colored in red, a critical problem exists with respect to one of the Toshiba VMs 1895 that is providing services for virtualized application 1893 that is part of the Toshiba port group 1891. On the other hand, VMs 1394 are graded green/normal (as represented with a backward slash fill pattern, which is used to represent green throughout FIG. 18).

Worst performance window 1803 illustrates a number of listings of the worst performers in the infrastructure. A tenant listing 1821 specifies a list of tenants ranked starting with the worst performer. List 1822 illustrates a list of the worst performing virtualized application in order starting from the worst. List 1823 illustrates a list of the worst performing virtual machines, starting from the worst at the top of the list.

Network performance window 1804 illustrates the overall network performance. In this case, the network performance is illustrated according to host, port group, and virtual machine. Referring to window 1804, data center ring 1833 represents the data center. Host ring 1834, which is closest to ring 1833, represents the performance of each physical host. Port group ring 1835 represents the performance of each port group associated with each physical host represented in ring 1834. Lastly, VM ring 1836 represents the performance of VMs that are associated with each port group in ring 1835 for each host specified in ring 1834. As with window 1802, red and green colors/grades are used to illustrate the relative performances of the physical hosts, port groups, and virtual machines in this example. Note that a majority of PortGroup ring 1835 has a grading of grey, which indicates that there is no data available for those items in that ring. This may be due to a lack of any application traffic (activities) during that time period. It could also indicate that the data collection system is unavailable during that time (e.g., down for maintenance).

Storage performance window 1805 illustrates a visualization of the storage performance. Referring to window 1805, the storage performance is specified using rings. Data center ring 1841 represents the data center. Physical store ring 1842, which is closest to ring 1841, represents the performance of each physical store (physical disk) associated with the data center. Data store ring 1843, which is around ring 1842, represents the performance of each virtual data store associated with each physical store (disk). Host ring 1844 represents the performance of each physical host that is associated with each virtual disk in ring 1843 and the performance of each physical disk in ring 1842. VM ring 1845 represents the performance of each virtual machine virtual disk that is associated with each virtual disk, each physical disk, and each physical host in the data center. Thus, using the storage performance shown in window 1805, a data center user can determine the storage performance of a physical disk, virtual data store, physical host, and virtual machine virtual disk. In the example given, physical store ring 1842, data store ring 1843 and host ring 1844 are graded green/normal, while VM ring 1845 is shown as gray.

CPU performance window 1806 illustrates one embodiment of a visualization of the CPU performance. Referring to window 1806, data center ring 1851 (center) represents the data center, while cluster ring 1852 and host ring 1853 represent the performance of each cluster and each physical host, respectively, in the data center. Each of rings 1852 and 1853 is subdivided according to cluster and physical host, respectively. Therefore, a data center manager can identify a specific host that is associated with a specific cluster by viewing the visualization. Thus, using the color presented in the visualization, the data center manager is able to quickly ascertain CPU performance for individual hosts and their associated clusters and the individual clusters by themselves. Note that this window includes the use of the color yellow as the grade (minor performance problem) for all of cluster ring 1852 and host ring 1853.

Memory performance window 1807 illustrates memory performance. Referring to window 1807, the memory performance is shown using a series of rings. Data center ring 1861 (center) specifies the data center, while cluster ring 1862 and host ring 1863 illustrate the performance of each cluster and each physical host, respectively, in the data center. Thus, cluster ring 1862 and physical host ring 1863 are divided according to cluster and host, respectively. Therefore, using the color presented in the visualization, a data center manager, upon reviewing the memory performance window 1807, is able to see the performance of individual clusters as well as the physical hosts associated with those clusters. Note that in the example given, cluster ring 1862 and host ring 1863 are all graded red/critical performance problem.

Figure 19:
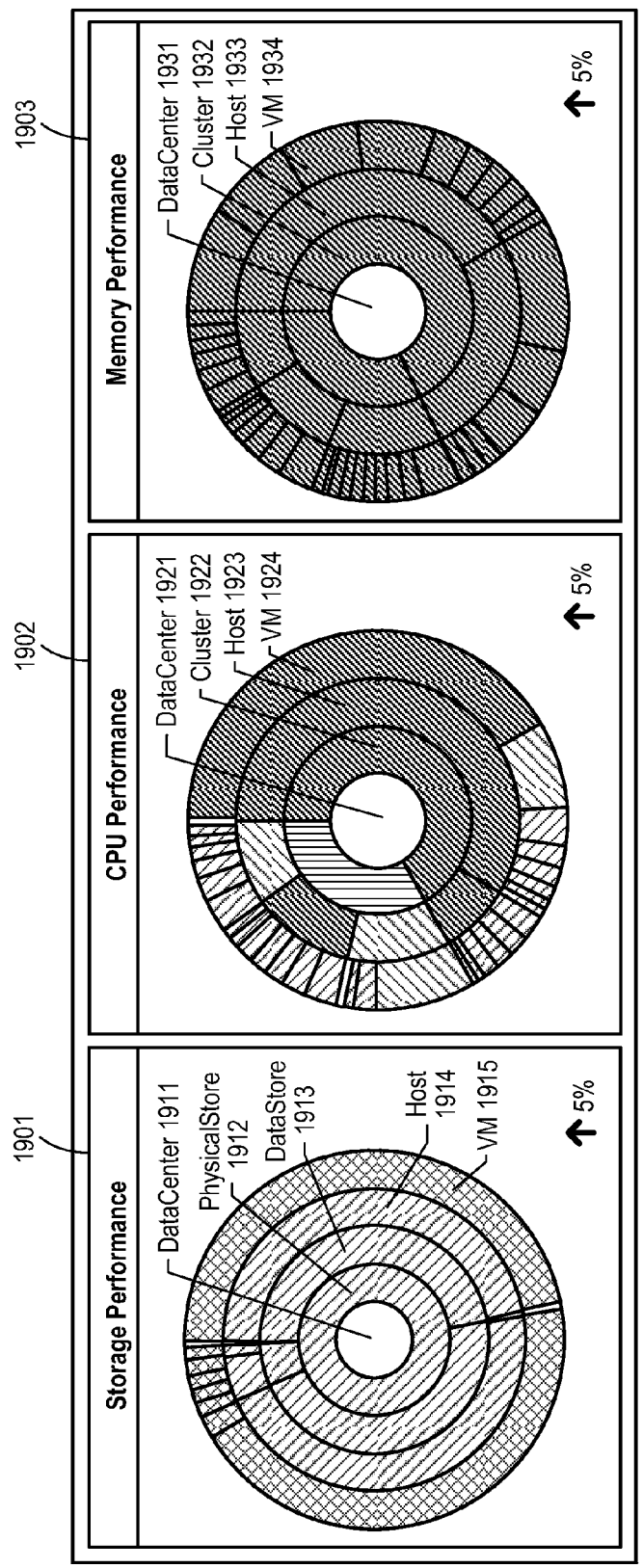
FIG. 19 illustrates an alternative user interface illustrating storage performance, CPU performance, and memory performance.

FIG. 19 illustrates an alternative user interface illustrating storage performance, CPU performance, and memory performance. Referring to FIG. 19, storage performance window 1901 illustrates the storage performance using data center ring 1911 that specifies the data center, physical store (physical disk) ring 1912 that specifies the performance of each physical disk in the data center, data store (virtual data store) ring 1913 that specifies the performance of each virtual data store that is associated with each physical disk in the data center, physical host ring 1914 that specifies the performance of each physical host that is associated with each virtual data store that is associated with each physical data store in the data center, and virtual machine virtual disk ring 1915 that specifies the performance of each virtual disk that is associated with each physical host in the data center. In the example given, physical store ring 1912, data store ring 1913, and host ring 1914 are all graded green/normal, while VM ring 1915 is shown as gray.

Similarly, CPU performance window 1902 illustrates CPU performance using a series of rings. Referring to CPU performance window 1902, data center ring 1921 specifies the data center, cluster ring 1922 specifies the cluster, host ring 1923 specifies the physical host, and VM ring 1924 specifies the VM performance. In the example given, the majority of cluster ring 1922 and host ring 1923, along with a portion of VM ring 1924 are graded red/critical performance problem, the remainder of cluster ring 1922 is graded orange/major performance problem, the remainder of host ring 1923 is graded yellow/minor performance problem, while VM ring 1924 has portions graded red, yellow and green.

Also, memory performance window 1903 specifies the memory performance using the same series of rings which are referred to as data center ring 1931, cluster ring 1932, physical host ring 1933, and VM virtual disk ring 1934, as used to specify performance in window 1902. In the example given, cluster ring 1932, host ring 1933 and VM ring 1934 are all graded red/critical performance problem.

FIG. 20 illustrates a chart that specifies one embodiment of a ring structure definition for the storage, CPU, and memory performance windows, such as storage performance window 1805 and 1901, CPU performance window 1806 and 1902, and memory performance window 1807 and 1903. Referring to FIG. 20, the ring color definition that indicates the performance metrics when compared against the baseline are also specified for storage, CPU, and memory performance.

The size of each of the rings in one embodiment is defined in FIG. 6. Each of the counter variables depicted in FIG. 6 is illustrated in Tables 1, 2, and 3, provided below.

Table 1 below illustrates one embodiment of the CPU performance counters. The information from the CPU performance counters is used to set the color/grade and size of the rings in the CPU performance visualization, such as that shown in CPU performance windows 1806 of FIG. 18 and CPU performance window 1902 of FIG. 19.

Referring to Table 1, the color (grading) of the rings, or portions thereof, in the CPU performance window is set according to the aggregated value of cpu.ready of the first row of Table 1, while the size of the ring is set based on the aggregated value of cpu.usagemhtz of the second row of Table 1. One or more of the values of cpu.usagemhtz of the second row of Table 1 are based on instance values of cpu.usagemhtz of the third row of Table 1.

TABLE 1

CPU PERFORMANCE COUNTERS
2. CPU Performance Counters:

| Name | Entity | Descriptions | Unit | Instance/Aggreggate |
|---|---|---|---|---|
| cpu.ready.summation | VM Host | Time that the virtual machine was ready, but could not get scheduled to run on the physical CPU. CPU ready time is dependent on the number of virtual machines on the host and their CPU loads. | millisecond | aggregate |
| cpu.usagemhz.average | VM Host | CPU usage, as measured in megahertz, during the interval: VM - Amount of actively used virtual CPU. This is the host's view of the CPU usage, not the guest operating system view. Host - Sum of the actively used CPU of all powered on virtual machines on a host. The maximum possible value is the frequency of the processors multiplied by the number of processors. For example, if you have a host with four 2 GHz CPUs running a virtual machine that is using 4000 MHz, the host is using two CPUs completely. 4000/(4 × 2000) = 0.50 | megaHertz | aggregate |
| cpu.usage.average | VM Host | CPU usage as a percentage during the interval: VM - Amount of actively used virtual CPU, as a percentage of total available CPU. This is the host's view of the CPU usage, not the guest operating system view. It is the average CPU utilization over all available virtual CPUs in the virtual machine. For example, if a virtual machine with one virtual CPU is running on a host that has four physical CPUs and the CPU usage is 100%, the virtual machine is using one physical CPU completely. virtual CPU usage = usagemhz/(# of virtual CPUs × core frequency) | percent | instance |

TABLE 1-continued

CPU PERFORMANCE COUNTERS
2. CPU Performance Counters:

| Name | Entity | Descriptions | Unit | Instance/Aggreggate |
|------|--------|--------------|------|---------------------|
| | | Host - Actively used CPU of the host, as a percentage of the total available CPU. Active CPU is approximately equal to the ratio of the used CPU to the available CPU. available CPU = # of physical CPUs × clock rate 100% represents all CPUs on the host. For example, if a four-CPU host is running a virtual machine with two CPUs, and the usage is 50%, the host is using two CPUs completely. Cluster - Sum of actively used CPU of all virtual machines in the cluster, as a percentage of the total available CPU. | | |

Table 2 below illustrates one embodiment of the memory performance counters. The information from the memory performance counters is used to set the color/grade and size of the rings in the memory performance visualization, such as that shown in memory performance windows 1807 of FIG. 18 and CPU performance window 1903 of FIG. 19.

Referring to Table 2, the color (grading) of the rings, or portions thereof, in the memory performance window is set according to the aggregated value of mem.swapinrate.average of the first row of Table 2. The size of the cluster and host rings (e.g., rings 1932 and 1933 of FIG. 19) is set based on the aggregated value of mem.consumed.average of the second row of Table 2. The size of the VM ring (e.g., ring 1934 of FIG. 19 is set based on the aggregated value of mem.active.average of the third row of Table 2.

TABLE 2

Memory Performance Counters
3. Memory Performance Counters

| Name | Entity | Descriptions | Unit | Instance/Aggregate |
|------|--------|--------------|------|--------------------|
| mem.swapinRate.average | VM Host Cluster | Rate at which memory is swapped from disk into active memory during the interval. This counter applies to virtual machines and is generally more useful than the swapin counter to determine if the virtual machine is running slow due to swapping, especially when looking at real-time statistics. | kiloBytesPerSecond | aggregate |
| mem.consumed.average | Host | Amount of memory consumed by a virtual machine, host, or cluster. Virtual machine: Amount of guest physical memory consumed by the virtual machine for guest memory. Consumed memory does not include overhead memory. It includes shared memory and memory that might be reserved, but not actually used. Use this metric for charge-back purposes. vm consumed memory = memory granted − memory saved due to memory sharing Host: Amount of machine memory used on the host. Consumed memory includes includes memory used by the Service Console, the VMkernel, vSphere services, plus the total consumed metrics for all running virtual machines. host consumed memory = total host memory − free host memory Cluster: Amount of host machine memory used by all powered on virtual machines in the cluster. A cluster's consumed memory consists of virtual machine consumed memory and overhead memory. It does not include host-specific overhead memory, such as memory used by the service console or VMkernel. | kiloBytes | aggregate |
| mem.active.average | VM | Amount of memory that is actively used, as estimated by VMkernel based on recently touched memory pages. Virtual machine: Amount of guest "physical" memory actively used. Host: Sum of all active metrics for all powered-on virtual machines plus vSphere services (such as COS, vpxa) on the host. | kiloBytes | aggregate |
| mem.usage.average | VM Host Cluster | Memory usage as percentage of total configured or available memory, expressed as a hundredth of a percent (1 = 0.01%). A value between 0 and 10,000. Virtual machine: Percentage of configured virtual machine "physical" memory: active + virtual machine configured size | percent | aggregate |

TABLE 2-continued

Memory Performance Counters
3. Memory Performance Counters

| Name | Entity | Descriptions | Unit | Instance/Aggregate |
|---|---|---|---|---|
| | | Host: Percentage of available machine memory: consumed ÷ machine-memory-size Cluster: memory usage = memory consumed + memory overhead ♦ effectivemem | | |

Table 3 below illustrates one embodiment of the storage performance counters. The information from the storage performance counters is used to set the color/grade and size of the rings in the storage performance visualization, such as that shown in storage performance windows 1805 of FIG. 18 and CPU performance window 1901 of FIG. 19.

Figure 17:
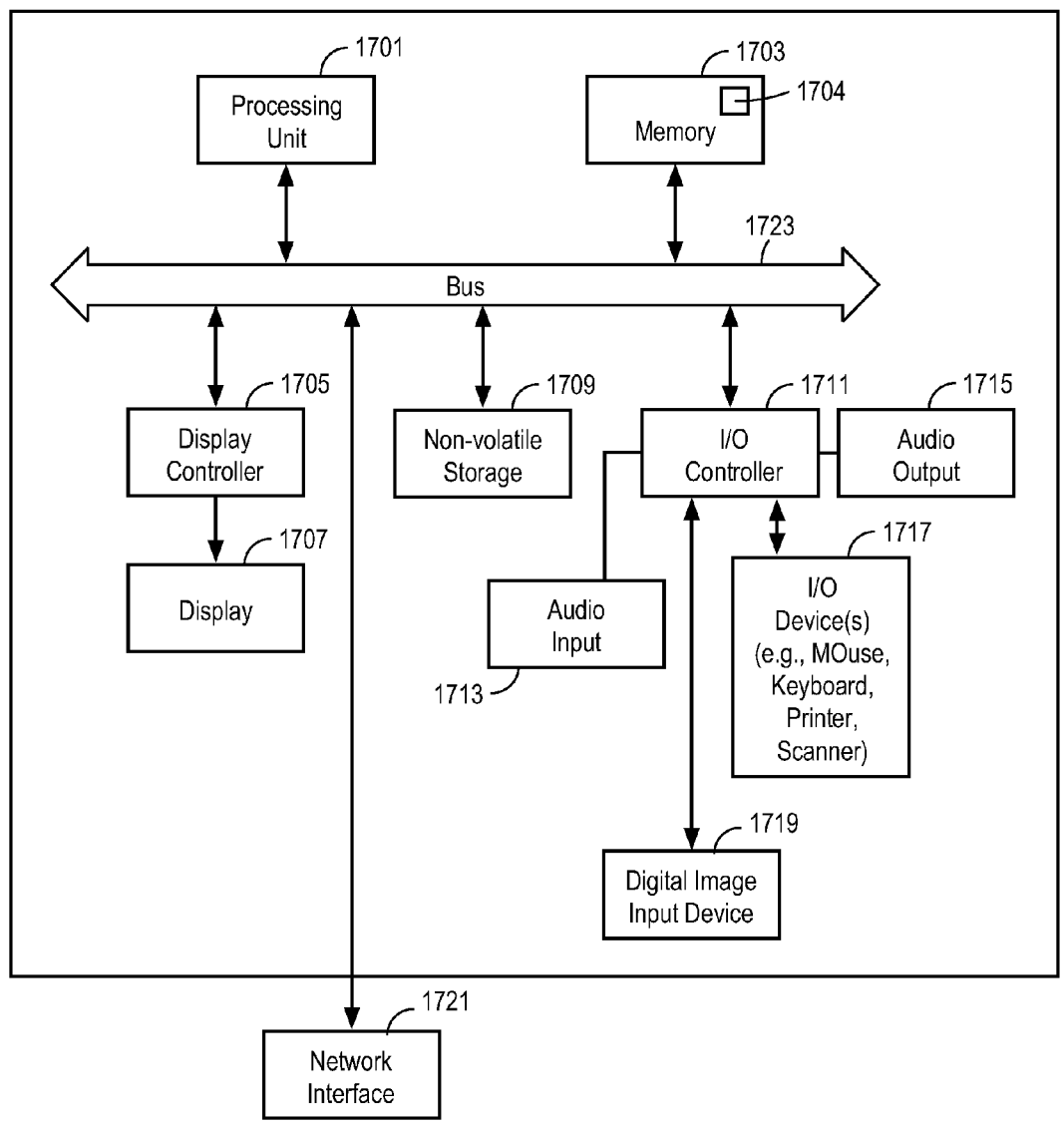
FIG. 17 is a block diagram of one embodiment of a data processing system to provide distributed infrastructure performance monitoring.

Referring to Table 3, the color (grading) of the rings, or portions thereof, in the storage performance window is set according to the aggregated value of disk.totalLatency.average of the first row of Table 3. The size of the rings around the center (e.g., rings 1842-845 of FIG. 18 and rings 1912-1915 of FIG. 19) is set based on the sum of read and write values from rows 2 and 3 of Table 3 or rows 4 and 5 of Table 3. Rows 4 and 5 are used to decide the size of the segment of the ring.

of Redmond, Wash.), or one of a wide variety of hardware platforms that run the UNIX operating system or other operating systems. For at least some embodiments, processing unit 1701 includes a general purpose or specific purpose data processing system based on Intel, AMD, Motorola, IBM, Sun Microsystems, IBM processor families, or any other processor families. As shown in FIG. 17, memory 1703 is coupled to the processing unit 1701 by a bus 1723. Memory 1703 has instructions and data 1704 stored thereon which when accessed by processing unit 1701 cause the processing unit 1701 to perform distributed virtual network monitoring methods, as described herein.

Memory 1703 can be dynamic random access memory ("DRAM") and can also include static random access memory ("SRAM"). A bus 1723 couples processing unit

TABLE 3

STORAGE PERFORMANCE COUNTERS
1. Storage Performance Counters

| Name | Entity | Descriptions | Unit | Instance/Aggregate |
|---|---|---|---|---|
| disk.totalLatency.average | Host datastore | Average amount of time taken during the collection interval to process a SCSI command issued by the Guest OS to the virtual machine. The sum of kernelLatency and deviceLatency. | millisecond | instance |
| disk.numberReadAveraged.average | vDisk/VM Host datastore | Average number of read commands issued per second to the datastore during the collection interval. | number | instance |
| disk.numberWriteAveraged.average | vDisk/VM Host datastore | Average number of write commands issued per second to the datastore during the collection interval. | number | instance |
| virtualDisk.totalReadLatency.average | VM | Average amount of time taken during the collection interval to process a SCSI read command issued from the Guest OS to the virtual machine. The sum of kernelReadLatency and deviceReadLatency. | millisecond | instance |
| virtualDisk.totalWriteLatency.average | VM | Average amount of time taken during the collection interval to process a SCSI write command issued by the Guest OS to the virtual machine. The sum of kernelWriteLatency and deviceWriteLatency. | millisecond | instance |

FIG. 17 shows a block diagram of an exemplary embodiment of a data processing system to provide distributed virtual network monitoring, as described herein. Data processing system 1700 includes a processing unit 1701 that may include a microprocessor or microprocessor, such as an Intel microprocessor (e.g., Core i7, Core 2 Duo, Core 2 Quad, Atom), Sun Microsystems microprocessor (e.g., SPARC), IBM microprocessor (e.g., IBM 750), Motorola microprocessor (e.g., Motorola 68000), Advanced Micro Devices ("AMD") microprocessor, Texas Instrument microcontroller, and any other microprocessor or microcontroller.

Processing unit 1701 may include a personal computer (PC), such as a Macintosh® (from Apple Inc. of Cupertino, Calif.), Windows®-based PC (from Microsoft Corporation

1701 to the memory 1703 and also to non-volatile storage 1709 and to display controller 1705 (if a display is used) and to the input/output (I/O) controller(s) 1711. Display controller 1705 controls in the conventional manner a display on a display device 1707 which can be a cathode ray tube (CRT), liquid crystal display (LCD), or any other display device. The input/output devices 1717 can include a keyboard, disk drives, printers, a scanner, a camera, and other input and output devices, including a mouse or other pointing device. The I/O controller 1711 is coupled to one or more audio input devices 1713, for example, one or more microphones.

The display controller 1705 and the I/O controller 1711 can be implemented with conventional well known technology. An audio output 1715, for example, one or more speakers may be coupled to an I/O controller 1711. The non-volatile storage 1709 is often a magnetic hard disk, an optical disk, or another form of storage for large amounts of data. Some of this data is often written, by a direct memory access process, into memory 1703 during execution of software in the data processing system 1700 to perform methods described herein.

One of skilled in the art will immediately recognize that the terms "computer-readable medium" and "machine-readable medium" include any type of storage device that is accessible by the processing unit 1701. A data processing system 1700 can interface to external systems through a modem or network interface 1721. It will be appreciated that the modem or network interface 1721 can be considered to be part of the data processing system 1700. This interface 1721 can be an analog modem, ISDN modem, cable modem, token ring interface, satellite transmission interface, or other interfaces for coupling a data processing system to other data processing systems.

It will be appreciated that data processing system 1700 is one example of many possible data processing systems which have different architectures. For example, personal computers based on an Intel microprocessor often have multiple buses, one of which can be an input/output (I/O) bus for the peripherals and one that directly connects the processing unit 1701 and the memory 1703 (often referred to as a memory bus). The buses are connected together through bridge components that perform any necessary translation due to differing bus protocols.

Network computers are another type of data processing system that can be used with the embodiments as described herein. Network computers do not usually include a hard disk or other mass storage, and the executable programs are loaded from a network connection into the memory 1703 for execution by the processing unit 1701. A typical data processing system will usually include at least a processor, memory, and a bus coupling the memory to the processor.

It will also be appreciated that the data processing system 1700 can be controlled by operating system software which includes a file management system, such as a disk operating system, which is part of the operating system software. Operating system software can be the family of operating systems known as Macintosh® Operating System (Mac OS®) or Mac OS X® from Apple Inc. Of Cupertino, Calif., or the family of operating systems known as Windows® from Microsoft Corporation of Redmond, Wash., and their associated file management systems. The file management system is typically stored in the non-volatile storage 1709 and causes the processing unit 1701 to execute the various acts required by the operating system to input and output data and to store data in memory, including storing files on the non-volatile storage 1709.

In various embodiments, hardwired circuitry may be used in combination with software instructions to implement methods described herein. A non-transitory machine readable medium can be used to store software and data which when executed by a data processing system causes the system to perform various methods described herein. This executable software and data may be stored in various places including for example ROM, volatile RAM, non-volatile memory, and/or cache. Portions of this software and/or data may be stored in any one of these storage devices.

Thus, a machine readable medium includes any mechanism that provides (i.e., stores and/or transmits) information in a form accessible by a machine (e.g., a computer, network device, or any device with a set of one or more processors, etc.). For example, a machine readable medium includes recordable/non-recordable media (e.g., read only memory (ROM); random access memory (RAM); magnetic disk storage media; optical storage media; flash memory devices; and the like.

The methods as described herein can be implemented using dedicated hardware (e.g., using Field Programmable Gate Arrays, or Application Specific Integrated Circuit) or shared circuitry (e.g., microprocessors or microcontrollers) under control of program instructions stored in a machine readable medium. The methods as described herein can also be implemented as computer instructions for execution on a data processing system, such as system 1700 of FIG. 9.

In the foregoing specification, embodiments as described herein have been described with reference to specific exemplary embodiments thereof. It will be evident that various modifications may be made thereto without departing from the broader spirit and scope of the embodiments as described herein. The specification and drawings are, accordingly, to be regarded in an illustrative sense rather than a restrictive sense.

What is claimed is:

1. A computer-implemented method to monitor a data center infrastructure, comprising:
   collecting traffic data from a network, including
      tapping traffic data using one or more virtual network traffic taps,
      duplicating, using the one or more virtual network traffic taps, packets of the traffic data, and
      forwarding, via a virtual network packet broker, duplicated packets to one or more monitoring tools;
   collecting storage I/O performance information;
   collecting central processing unit (CPU) and memory usage information;
   determining a virtual infrastructure of the network comprising virtual entities;
   grouping the traffic data based at least on the virtual entities, including correlating the duplicated packets to associate the packets with individual packet flows;
   generating a user interface of application performance indicating any application performance degradation due to one or more of virtual and physical infrastructure components, including results of determined correlations between the one or more of virtual and physical infrastructure components, while directing grouped traffic data to one or more analysis tools based on group; and using the one or more analysis tools to analyze the grouped traffic data using correlated, duplicated packets to indicate performance according to the virtual infrastructure of which they are part.

2. The method of claim 1, wherein the traffic data are collected using a virtual network traffic tap integrated into the virtual infrastructure.

3. The method of claim 1, further comprising
   determining physical entities of the network; and
   grouping the traffic data according to the physical entities.

4. The method of claim 1, wherein the virtual entities comprise one or more of a virtual machine, a virtual switch, a virtual application, a port group, a virtual network; and a virtual network interface card.

5. The method of claim 1, further comprising:
   determining protocol entities of the network; and
   grouping the traffic data based on the protocol entities.

6. The method of claim 1, further comprising:
   mapping the virtual entities.

7. The method of claim 1, further comprising:
   dispatching the traffic data based at least on the virtual entities.

8. The method of claim 1, further comprising:
analyzing the traffic data using the virtual entity information.

9. The method of claim 1, further comprising:
identifying the traffic data as an intra data center flow.

10. The method of claim 1, further comprising:
identifying the traffic data as traversing a data center aggregation layer comprising the virtual entities.

11. The method of claim 1, further comprising, while directing grouped traffic data to one or more analysis tools for analysis:
monitoring application performance over the infrastructure with the physical and virtual components, including updating performance counters based on statistics collected from the virtual and physical components;
identifying degradation in the application performance; and
correlating the degradation to one or more of virtual and physical infrastructure components.

12. A non-transitory machine-readable storage medium containing executable program instructions which when executed by a data processing system cause the system to monitor a data center infrastructure, comprising:
collecting traffic data from a network, including
tapping traffic data using one or more virtual network traffic taps,
duplicating, using the one or more virtual network traffic taps, packets of the traffic data, and
forwarding, via a virtual network packet broker, duplicated packets to one or more monitoring tools;
collecting storage I/O performance information;
collecting central processing unit (CPU) and memory usage information;
determining a virtual infrastructure of the network comprising virtual entities;
grouping the traffic data based at least on the virtual entities, including correlating the duplicated packets to associate the packets with individual packet flows;
generating a user interface of application performance indicating any application performance degradation due to one or more of virtual and physical infrastructure components, including results of determined correlations between the one or more of virtual and physical infrastructure components, while directing grouped traffic data to one or more analysis tools based on group; and using the one or more analysis tools to analyze the grouped traffic data using correlated, duplicated packets to indicate performance according to the virtual infrastructure of which they are part.

13. The non-transitory machine-readable storage medium of claim 12, wherein the traffic data are collected using a virtual network traffic tap integrated into the virtual infrastructure.

14. The non-transitory machine-readable storage medium of claim 12, further comprising instructions that cause the data processing system to perform operations comprising
determining physical entities of the network; and
grouping the traffic data according to the physical entities.

15. The non-transitory machine-readable storage medium of claim 12, wherein the virtual entities comprise one or more of a virtual machine, a virtual switch, a virtual application, a port group, a virtual network; and a virtual network interface card.

16. The non-transitory machine-readable storage medium of claim 12, further comprising instructions that cause the data processing system to perform operations comprising
determining protocol entities of the network; and
grouping the traffic data based on the protocol entities.

17. The non-transitory machine-readable storage medium of claim 12, further comprising instructions that cause the data processing system to perform operations comprising
mapping the virtual entities.

18. The non-transitory machine-readable storage medium of claim 12, further comprising instructions that cause the data processing system to perform operations comprising
dispatching the traffic data based at least on the virtual entities.

19. The non-transitory machine-readable storage medium of claim 12, further comprising instructions that cause the data processing system to perform operations comprising
analyzing the traffic data using the virtual entity information.

20. The non-transitory machine-readable storage medium of claim 12, further comprising instructions that cause the data processing system to perform operations comprising
identifying the traffic data as an intra data center flow.

21. The non-transitory machine-readable storage medium of claim 12, further comprising instructions that cause the data processing system to perform operations comprising
identifying the traffic data as traversing a data center aggregation layer comprising the virtual entities.

22. A data processing system to monitor a network, comprising:
a communication interface to communication with physical and virtual entities of a network infrastructure;
a memory to store collected traffic data, storage I/O performance information, and central processing unit (CPU) and memory usage information from the network infrastructure;
a processor coupled to the memory, the processor
to determine a virtual infrastructure of comprising virtual entities, by, in part,
tapping traffic data using one or more virtual network traffic taps,
duplicating, using the one or more virtual network traffic taps, packets of the traffic data, and
forwarding, via a virtual network packet broker, duplicated packets to one or more monitoring tools,
to group the traffic data based at least on the virtual entities by, in part, correlating the duplicated packets to associate the packets with individual packet flows, and
to generate a user interface of application performance indicating any application performance degradation due to one or more of virtual and physical infrastructure components, including results of determined correlations between the one or more of virtual and physical infrastructure components, while directing grouped traffic data to one or more analysis tools based on group; and using the one or more analysis tools to analyze the grouped traffic data using correlated, duplicated packets to indicate performance according to the virtual infrastructure of which they are part.

23. The data processing system of claim 22, wherein the traffic data are collected using a virtual network traffic tap integrated into the virtual infrastructure.

24. The data processing system of claim 22, wherein the processor is further to determine physical entities of the network; and to group the traffic data according to the physical entities.

25. The data processing system of claim 22, wherein the virtual entities comprise one or more of a virtual machine, a virtual switch, a virtual application, a port group, a virtual network; and a virtual network interface card.

26. The data processing system of claim 22, wherein the processor is further to determine protocol entities of the network; and to group the traffic data based on the protocol entities.

27. The data processing system of claim 22, wherein the processor is to map the virtual entities.

28. The data processing system of claim 22, wherein the processor is further to dispatch the traffic data based at least on the virtual entities.

29. The data processing system of claim 22, wherein the processor is further to analyze the traffic data using the virtual entity information.

30. The data processing system of claim 22, wherein the processor is further to identify the traffic data as an intra data center flow.

31. The data processing system of claim 22, wherein the processor is further to identify the traffic data as traversing a data center aggregation layer.

* * * * *